(12) United States Patent
Naik et al.

(10) Patent No.: US 12,302,424 B1
(45) Date of Patent: May 13, 2025

(54) PAIRING-LESS DEVICE CONNECTIVITY

(71) Applicant: Amazon Technologies, Inc., Seattle, WA (US)

(72) Inventors: Apoorv Naik, Carlsbad, CA (US); Bharath Bhimanaik Kumar, Sammamish, WA (US); Matthew Todd Kaufman, Truckee, CA (US); Gonzalo Alvarez Barrio, Seattle, WA (US); Fred Torok, Mercer Island, WA (US); Gilles-Arnaud Bleu-Laine, San Ramon, CA (US); Abraham Martin Passaglia, Seattle, WA (US); Ajay Gowribidanur Ramesh, Milpitas, CA (US); Choong Ryeol Lee, San Jose, CA (US); Carlos Leija, Austin, TX (US)

(73) Assignee: Amazon Technologies, Inc., Seattle, WA (US)

(*) Notice: Subject to any disclaimer, the term of this patent is extended or adjusted under 35 U.S.C. 154(b) by 190 days.

(21) Appl. No.: 17/217,774

(22) Filed: Mar. 30, 2021

(51) Int. Cl.
  *H04W 12/37* (2021.01)
  *H04W 12/037* (2021.01)
  *H04W 76/14* (2018.01)

(52) U.S. Cl.
  CPC ......... *H04W 76/14* (2018.02); *H04W 12/037* (2021.01); *H04W 12/37* (2021.01)

(58) Field of Classification Search
  None
  See application file for complete search history.

(56) References Cited

U.S. PATENT DOCUMENTS

| | | | |
|---|---|---|---|
| 9,785,247 B1* | 10/2017 | Horowitz | H04N 13/296 |
| 11,632,366 B1* | 4/2023 | Shemesh | H04L 67/1004 |
| | | | 726/3 |
| 11,936,946 B2* | 3/2024 | Dhiman | H04N 21/4532 |
| 2013/0185654 A1* | 7/2013 | Harris | H04W 8/18 |
| | | | 715/753 |
| 2015/0346701 A1* | 12/2015 | Gordon | H04L 12/2809 |
| | | | 700/275 |
| 2016/0295622 A1* | 10/2016 | Huang | H04W 24/10 |
| 2017/0004475 A1* | 1/2017 | White | G06Q 20/322 |
| 2019/0182666 A1* | 6/2019 | Kotay | H04W 76/18 |
| 2020/0304470 A1* | 9/2020 | Subbarayan | H04L 63/04 |
| 2020/0314247 A1* | 10/2020 | Klingler | H04M 3/54 |
| 2021/0350639 A1* | 11/2021 | Sabripour | H04L 63/0861 |
| 2022/0014897 A1* | 1/2022 | Mantri | H04W 4/80 |
| 2022/0015009 A1* | 1/2022 | Garrett | H04W 4/80 |
| 2022/0052867 A1* | 2/2022 | Nakano | H04W 4/023 |

* cited by examiner

*Primary Examiner* — Trang T Doan
(74) *Attorney, Agent, or Firm* — Eversheds Sutherland (US) LLP

(57) ABSTRACT

Systems and methods for pairing-less device connectivity are disclosed. For example, a group of primary devices are authorized to establish a non-bonded connection with a given secondary device. When the secondary device is in proximity of at least one of the group of primary devices, that primary device may receive a wireless beacon from the secondary device. The system may identify the primary device as an authorized device, perform user presence confirmation processes, and send a command to the primary device to establish the non-bonded connection. Encryption using a network layer or a presentation layer and an application layer of a computer network, instead of a link layer, is utilized for secure data transmission over the non-bonded connection.

20 Claims, 11 Drawing Sheets

PAIRING-LESS DEVICE CONNECTIVITY

BACKGROUND

Devices may be paired with each other for the sending and receipt of data. Pairing frequently includes user input and results in a sustained connection between devices. Described herein are improvements in technology and solutions to technical problems that can be used to, among other things, enhance device connectivity.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 illustrates a conceptual diagram for selecting an authorized device for establishing a pairing-less connection with.

DETAILED DESCRIPTION

Figure 1:
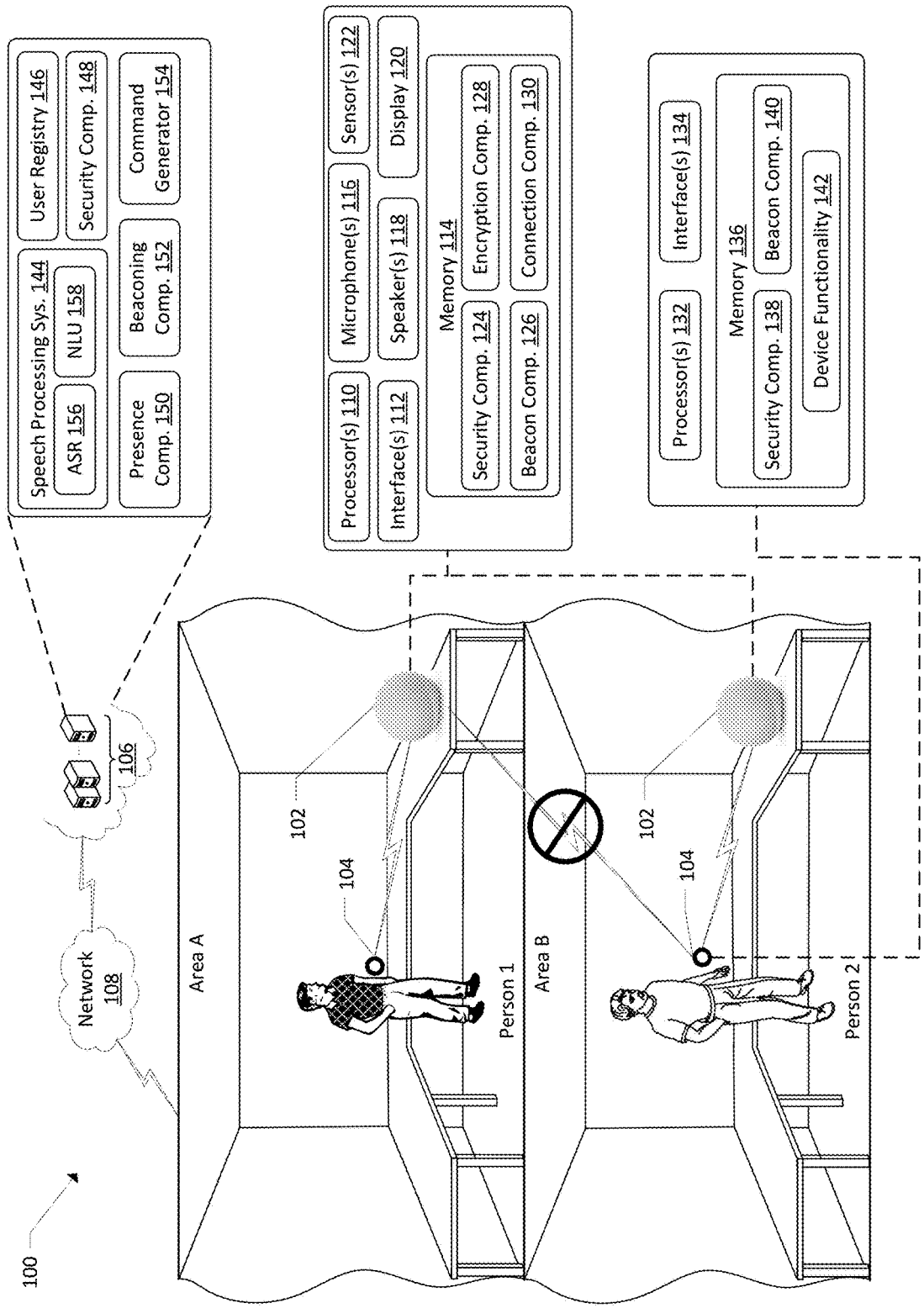
FIG. 1 illustrates a schematic diagram of an example environment for pairing-less device connectivity.

Systems and methods for pairing-less device connectivity are disclosed. Take, for example, an environment (such as a home, hotel, vehicle, office, store, restaurant, or other space) where one or more users may be present. The environments may include one or more electronic devices that may be utilized by the users. For example, the electronic devices may include voice interface devices (e.g., Echo devices, mobile phones, tablets, personal computers, televisions, appliances like refrigerators and microwaves, etc.), graphical interface devices (e.g., televisions, set top boxes, virtual/augmented reality headsets, etc.), and/or touch interface devices (tablets, phones, steering wheels, laptops, kiosks, billboard, other devices with buttons, etc.). These electronic devices may be situated in a home, in a place a business, healthcare facility (e.g., hospital, doctor's office, pharmacy, etc.), in a vehicle (e.g., airplane, truck, car, bus, etc.) in a public forum (e.g., shopping center, store, etc.), and/or at a hotel/quasi-public area, for example.

Generally, when electronic devices are wirelessly connected to each other, those devices are paired or otherwise bonded and/or linked. An example of such pairing includes the use of the Bluetooth standard protocol to establish an association between two or more devices. For example, pairing can include each of the devices involved to be put into a pairing mode, where one device receives pairing data from the other device, and vice-versa, utilizing a network connection between the devices. Once devices are paired, the association between the devices can be maintained until the devices are unpaired. In situations where the data link between devices is to be maintained for a long period of time and/or when pairing with several other devices is not desirable, pairing may be sufficient for sending data between such devices. However, in instances where connection between devices is for a relatively short time, and/or when initiating pairing is undesirable, and/or when a given device will be connected and unconnected from multiple devices over a somewhat short period of time, connecting devices using pairing processes may not be preferable.

As such, pairing-less device connectivity may be preferable. Voice interface devices, for example, can be utilized as the primary devices (e.g., mains power supplied device) used to connect a given secondary device (e.g., battery power supplied device), but it should be understood that the primary devices may be any type of electronic device(s) (including, e.g., battery power supplied devices). Additionally, the secondary device may be any electronic device, but will be described herein by way of example as a wearable or otherwise portable device that is brought by a user to and from multiple environments, with those environments having primary devices that are typically left in the environments. To perform pairing-less device connectivity, in examples, data is received at a system associated with electronic devices that indicates one or more associations between primary devices and secondary devices. For example, a given secondary device may be associated with an application and system for operation of the secondary device. In these examples, the application may be utilized to register the secondary device, including gathering information including the device identifier for the secondary device, the user device where the application is installed and/or accessed, an identifier of an enterprise system associated with the secondary device, an identifier of a given environment associated with the user, and/or limitations on associations between a user and environments, such as a duration of when the user is associated with an environment. By way of example, the secondary device may be a wearable or other type of portable device that is acquired in association with a guest checking in at a hotel or becoming a tenant of an office/apartment building, such as a smart wristband and/or keycard. The identifier of the secondary device may be associated with the user, with the room the user is staying in or otherwise associated with and/or one or more attractions, meetings, and/or other events that the guest has registered for. Data indicating these associations may be received at a remote system associated with the primary devices from the user device, from the system associated with the environment, and/or from one or more other systems associated with the secondary device and/or the environment.

The remote system may receive the association data and may determine a group of primary devices that the secondary device is authorized to establish a non-bonded connection to. For example, utilizing the hotel example above, the remote system may identify a first primary device associated with the room the guest is staying at, primary devices associated with a communal space of the hotel, and primary devices associated with an attraction of the hotel. The remote system may store, in a user registry or other database, an indication of the group of the primary devices for which the secondary device is authorized to establish a non-bonded connection with. The remote system may also send, to some or all of the primary devices, security credentials to be utilized for establishing the non-bonded connection with the secondary device. In addition to the security credentials sent to the group of primary devices, the secondary devices may be manufactured or otherwise may have installed thereon security credentials for establishing the non-bonded connections. As will be described in more detail herein, non-bonded connections may only be established when both the primary device and the secondary device have security credentials that allow for such connections.

A user may then transport, such as by wearing and walking with, the secondary device from location to location. The secondary device may emit a wireless beacon periodically or otherwise repeatedly. As used herein, the "wireless beacon" represents a signal transmitted from the secondary device. The strength of the signal may vary, but generally is strong enough to be received by one or more other devices that a certain distance or less from the secondary device. The distance may vary based on environmental and/or device-related factors, but by way of example, the distance may be 5 feet, 10 feet, 15 feet, 25 feet, etc. When the secondary device is positioned such that the wireless beacon from the secondary device is received at the primary device, the primary device may initiate establishing the non-bonded connection between the devices. For example, an identifier of the secondary device may be included in the wireless beacon and data indicating the identifier of the secondary device may be sent to the remote system. A beaconing component of the remote system may receive the data from the primary device and determine whether the primary device is authorized to establish a non-bonded connection with the secondary device. In examples where the beaconing component determines that the primary device is not authorized, the remote system may send a response to the primary device indicating that a connection is not to be established. Utilizing the hotel example above, a user may walk down a hallway of a hotel, and as the user walks with the secondary device, multiple primary devices in the rooms the user walks by may receive the wireless beacon from the secondary device. However, as the user walks by rooms that are not assigned to the user, the primary devices in those rooms will not connect to the secondary device. When the user reaches her/his room, the primary device situated in that room may receive the wireless beacon from the secondary device and the beaconing component of the remote system may determine that the primary device is authorized to establish a non-bonded connection with the secondary device.

Prior to establishing the non-bonded connection, the system may perform one or more presence confirmation operations to confirm that a user associated with the secondary device is present in the environment where the primary device is situated. Again utilizing the hotel example, a hotel room may have multiple spaces each having their own primary device, but the user and the secondary device may be located in just one of those spaces. In this example, the primary devices in all of the spaces may detect the wireless beacon, but a connection would be desirable to just the device where the user is present. To perform the presence confirmation operations, sensor data may be received from the environment in question. The sensor data may be received from any sensor associated with the environment, including, for example, a microphone, a camera, a thermometer, etc. The sensor data may also be received from one or more devices associated with the environment, such as a user device associated with the user, door locks, etc. This sensor data may be analyzed by a presence component of the remote system to determine whether a user is present in the environment where the primary device at issue is disposed. For example, the presence component may utilize audio data from a microphone of the environment to identify the presence of user speech, footsteps, user movement, and/or user interaction with the environment, which may indicate presence of a user. By way of other examples, image data may be analyzed to detect movement in the environment, and/or device-beaconing data from a user device may indicate that the user device is present in the environment.

In situations where the primary device is determined to be authorized to establish a non-bonded connection with the secondary device, and where presence of a user is detected, a command generator of the remote system may be utilized to generate a command for the primary device to establish the non-bonded connection. The command may cause the primary device to utilize the security credentials previously sent to the primary device to establish the non-bonded connection. In some examples, instead of sending a command, the remote system may send an indication that the connection is authorized, and the primary device may utilize that indication to establish the non-bonded connection. To establish the non-bonded connection, the primary device and the secondary device may utilize a short-range network and protocols associated with that network, such as Bluetooth Low Energy, to send and receive data, but without the requirement of pairing and without transmitting data via a link layer of the network.

In these examples where a non-bonded connection is established, transmission of data between the devices may utilize encryption means that differ at least in part from bonded connections. For example, in a typical bonded connection, data encryption occurs at the link layer of the network. However, as referred to herein, in a non-bonded connection where the link layer is not utilized, data transmitted between devices may be encrypted at the network layer and at the application layer. The network-layer encryption may promote secure communication between devices over the network in question. The application-layer encryption may promote secure communication between applications running on the primary device and the secondary device. In other examples, double encryption may be performed at the application layer and at the presentation layer of the network. In these examples, the application-layer encryption may promote secure communication between applications running on the primary device and the secondary device. The presentation-layer encryption may promote secure communications for data translation for the network. By so doing, the primary device and the secondary device may transmit data to and from each other in a secure manner without needing to pair the devices or otherwise engage in setting up the devices to work with each other. This process may be repeated as the user moves from space to space, connecting and disconnecting from primary devices as the user travels to spaces with authorized primary devices and presence of the user is detected.

In addition to, or instead of, presence confirmation operations as described herein, other confirmatory operations may be performed. For example, the primary device and/or the remote system may determine that the wireless beacon as transmitted from the secondary device is received at the primary device for at least a threshold amount of time. For example, for certain primary devices, if the user moves past the primary device but then continues on to another space, connection to the primary device may not be desirable. As such, connection to the primary device may occur, in these examples, when the wireless beacon is received at the primary device for at least the threshold amount of time, such as, for example, for at least 10 seconds. In still other examples, a received signal strength indicator (RSSI) value may be utilized. For example, it may be desirable to connect to a primary device when the secondary device is sufficiently close to the primary device. The primary device may receive the wireless beacon and an RSSI value associated with the received wireless beacon may be determined. In examples, when the RSSI value satisfies a threshold RSSI value, the primary device may establish the non-bonded connection with the secondary device. It should be understood that one, some, or all of the confirmatory processes described herein may be performed. In examples, these processes may increase a confidence level that the primary device and the secondary device should be connected.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for pairing-less device connectivity. The system 100 may include, for example, one or more primary devices 102 and one or more secondary devices 104. In certain examples, the devices 102, 104 may be a voice-enabled device (e.g., Echo devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In examples, the devices 102, 104 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, hotel, etc.), for example. The devices 102, 104 may be configured to send data to and/or receive data from a remote system 106, such as via a network 108. It should be understood that where operations are described herein as being performed by the remote system 106, some or all of those operations may be performed by the devices 102, 104. It should also be understood that anytime the remote system 106 is referenced, that system may include any system and/or device, whether local to an environment of the devices 102, 104 or remote from that environment. Additionally, it should be understood that a given space and/or environment may include numerous electronic devices 102, 104. It should also be understood that when a "space" or "environment" is used herein, those terms mean an area and not necessarily a given room, building, or other structure, unless otherwise specifically described as such.

The primary devices 102 may include one or more components, such as, for example, one or more processors 110, one or more network interfaces 112, memory 114, one or more microphones 116, one or more speakers 118, one or more displays 120, and/or one or more sensors 122. The microphones 116 may be configured to capture audio, such as user utterances, and generate corresponding audio data. The speakers 118 may be configured to output audio, such as audio corresponding to audio data received from another device and/or the system 106. The displays 120 may be configured to display images corresponding to image data, such as image data received from the remote system 106 and/or one or more other devices. The sensors 122 may include any component configured to detect an environmental condition associated with the devices 102, 104 and/or the environment associated with the devices 102, 104. Some example sensors 122 may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the devices, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. In addition to specific environmental conditions that are detectable by the sensors 122, usage data and/or account data may be utilized to determine if an environmental condition is present. The memory 114 of the primary devices 102 may include a security component 124, a beacon component 126, an encryption component 128, and/or a connection component 130. These components of the memory 114 will be described in more detail below by way of example.

The secondary devices 104 may include components such as, for example, one or more processors 132, one or more network interfaces 134, and memory 136. The memory 136 may include one or more components such as, for example, a security component 138, a beacon component 140, and/or device functionality 142. These components of the memory 136 will be described in more detail below by way of example. With respect to the device functionality 142, that functionality may include any functionality that the device is configured to perform, such as sending information, outputting audio, outputting video, outputting light, etc.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 108 and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The remote system 106 may include components such as, for example, a speech processing system 144, a user registry 146, a security component 148, a presence component 150, a beaconing component 152, and/or a command generator 154. It should be understood that while the components of the remote system 106 are depicted and/or described as separate from each other in FIG. 1, some or all of the components may be a part of the same system. The speech processing system 144 may include an automatic speech recognition component (ASR) 156 and/or a natural language understanding component (NLU) 158. Each of the components described herein with respect to the remote system 106 may be associated with their own systems, which collectively may be referred to herein as the remote system 106, and/or some or all of the components may be associated with a single system. Additionally, the remote system 106 may include one or more applications, which may be described as skills. "Skills," as described herein may be applications and/or may be a subset of an application. For example, a skill may receive data representing an intent. For example, an intent may be determined by the NLU component 158 and/or as determined from user input via a computing device. Skills may be configured to utilize the intent to output data for input to a text-to-speech component, a link or other resource locator for audio data, and/or a command to a device, such as the devices 102, 104. "Skills" may include applications running on devices, such as the devices 102, 104, and/or may include portions that interface with voice user interfaces of devices 102, 104.

In instances where a voice-enabled device is utilized, skills may extend the functionality of devices 102, 104 that can be controlled by users utilizing a voice-user interface. In some examples, skills may be a type of application that may be useable in association with secondary devices 104 and may have been developed specifically to work in connection with given secondary devices 104. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

The components of the primary devices 102, the secondary devices 102, and the remote system 106 are described in detail below. In examples, some or each of the components of the remote system 106 may include their own processor(s), network interface(s), and/or memory. As such, by way of example, the speech processing system 144 may include and/or be associated with processor(s), network interface(s), and/or memory. The other components of the remote system 106, such as the presence component 150, may include and/or be associated with different processor(s), network interface(s), and/or memory, or one or more of these components may utilize some or all of the same processor(s), network interface(s), and/or memory utilized by the speech processing system 144. These components are described in detail below. Additionally, the operations and/or functionalities associated with and/or described with respect to the components of the remote system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the remote system 106, the user registry 146 may be configured to determine and/or generate associations between users, user accounts, environment identifiers, and/or devices. For example, one or more associations between user accounts may be identified, determined, and/or generated by the user registry 146. The user registry 146 may additionally store information indicating one or more applications and/or resources accessible to and/or enabled for a given user account. Additionally, the user registry 146 may include information indicating device identifiers, such as naming identifiers, associated with a given user account, as well as device types associated with the device identifiers. The user registry 146 may also include information indicating user account identifiers, naming indicators of devices associated with user accounts, and/or associations between devices, such as the devices 102, 104. The user registry 146 may also include information associated with usage of the devices 102, 104. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 144 may be configured to receive audio data from the primary devices 102 and/or other devices and perform speech-processing operations. For example, the ASR component 156 may be configured to generate text data corresponding to the audio data, and the NLU component 158 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "change Band A color to red," the NLU component 158 may identify a "change color" intent and the payload may be "Band A color to red." In this example where the intent data indicates an intent to cause a light associated with a secondary device 104 to change colors, the speech processing system 144 may call one or more speechlets to effectuate the intent. Speechlets, as described herein may otherwise be described as applications and may include functionality for utilizing intent data to generate directives and/or instructions. For example, a speechlet associated with the secondary device 104 may be called. The speechlet may be designated as being configured to handle the intent of identifying the color requested and providing instructions for causing the secondary device 104 to change colors, for example. The speechlet may receive the intent data and/or other data associated with the user utterance from the NLU component 146, such as by an orchestrator of the remote system 106, and may perform operations to instruct the secondary devices 104 to emit light in the requested color, for example. The remote system 106 may generate audio data confirming that the requested color is being emitted by the secondary device 104, such as by a text-to-speech component. The data may be sent from the remote system 106 to the primary device 102.

The components of the system 100 are described below by way of example. For example, to perform pairing-less device connectivity, data is received at a system associated with a given secondary device 104 and/or an environment associated with the secondary device 104. The data may indicate one or more associations between primary devices 102 and secondary devices 104. For example, a given secondary device 104 may be associated with an application and system for operation of the secondary device 104. In these examples, the application may be utilized to register the secondary device 104, including gathering information including the device identifier for the secondary device 104, the user device where the application is installed and/or accessed, an identifier of an enterprise and/or enterprise system associated with the secondary device 104, an identifier of a given environment associated with the user, and/or limitations on associations between a user and environments, such as a duration of when the user is associated with an environment. Acquisition of the this association data, and/or the registration of a secondary device 104 as described herein may be performed in multiple ways. For example, a visual device indicator may be provided on the secondary device 104 and the user may provide user input to the application corresponding to the visual device indicator. In other examples, a code of the secondary device 104 may be scannable to acquire the device identifier. In still other examples, near-field communication techniques may be utilized to acquire the device identifier. Additionally, associations between the secondary device 104 and the environments at issue and/or accounts associated with a user may be acquired by user input to the application, by querying a system associated with the environment, and/or by querying systems associated with the secondary device 104. By way of example, the secondary device 104 may be a wearable device that is acquired in association with a guest checking in at a hotel. The identifier of the secondary device 104 may be associated with the guest, with the room the guest is staying at, with the hotel the guest is staying at, and/or one or more attractions and/or events that the guest has registered for. Data indicating these associations may be received at the remote system 106, from the system associated with the environment, and/or from one or more other systems associated with the secondary device 104 and/or the environment.

The remote system 106 may receive the association data, and the security component 148 may determine a group of primary devices 102 that the secondary device 104 is authorized to establish a non-bonded connection to. For example, utilizing the hotel example above, the security component 148 may identify a first primary device 102 associated with the room the guest is staying at, primary devices 102 associated with a communal space of the hotel, and primary devices 102 associated with an attraction of the hotel. The remote system 106 may store, in the user registry 146 or other database, an indication of the group of the primary devices 102 for which the secondary device 104 is authorized to establish a non-bonded connection with. The security component 148 may also send, to some or all of the primary devices 102, security credentials to be utilized for establishing the non-bonded connection with the secondary device 102. In addition to the security credentials sent to the group of primary devices 102, the secondary devices 104 may be manufactured or otherwise may have installed thereon security credentials for establishing the non-bonded connections. As will be described in more detail herein, non-bonded connections may only be established when both the primary device 102 and the secondary device 104 have security credentials that allow for such connections. The security credentials, as described herein, may include one or more public and/or private keys, one or more security policies, one or more security certificates, and/or other security components that each device involved in the non-bonded connection will need to establish the connection. The security component 138 of the secondary device 104 may store the security credentials for the secondary device 104, and the security component 124 of the primary device 102 may store the security credentials for the primary device 102.

A user may then transport, such as by wearing and walking, the secondary device 104 from location to location. The secondary device 104 may emit a wireless beacon periodically or otherwise repeatedly. For example, the beacon component 140 of the secondary device 104 may be configured to cause the secondary device 104 to emit the wireless beacon. When the secondary device 104 is positioned such that the primary device 102 receives the wireless beacon, the primary device 102 may initiate establishing the non-bonded connection between the devices. For example, an identifier of the secondary device 104 may be included in the wireless beacon and data indicating the identifier of the secondary device 104 may be sent to the remote system 106. The beaconing component 152 of the remote system 106 may receive the data from the primary device 102 and determine whether the primary device 102 is authorized to establish a non-bonded connection with the secondary device 104. In examples where the beaconing component 152 determines that the primary device 102 is not authorized, the remote system 106 may send a response to the primary device 102 indicating that a connection is not to be established. Utilizing the hotel example above, a user may walk down a hallway of a hotel, and as the user walks with the secondary device 104, multiple primary devices 102 may receive the wireless beacon from the secondary device 104. However, as the user walks by rooms that are not assigned to the user, the primary devices 102 in those rooms will not connect to the secondary device 104. When the user reaches her/his room, the primary device 102 situated in that room may receive the wireless beacon from the secondary device 104 and the beaconing component 152 of the remote system 106 may determine that the primary device 102 is authorized to establish a non-bonded connection with the secondary device 104.

Prior to establishing the non-bonded connection, the remote system 106 may perform one or more presence confirmation operations to confirm that a user associated with the secondary device 104 is present in the environment where the primary device is situated. Again utilizing the hotel example, a hotel room may have multiple spaces each having their own primary device 102, but the user and the secondary device 104 may be located in just one of those spaces. In this example, the primary devices 102 in all of the spaces may detect the wireless beacon, but a connection would be desirable to just the device where the user is present. To perform the presence confirmation operations, sensor data may be received from the environment in question. The sensor data may be received from any sensor associated with the environment, including, for example, a microphone, a camera, a thermometer, etc. The sensor data may also be received from one or more devices associated with the environment, such as a user device associated with the user, door locks, etc. This sensor data may be analyzed by the presence component 150 to determine whether a user is present in the environment where the primary device 102 at issue is disposed. For example, the presence component 150 may utilize audio data from a microphone of the environment to identify the presence of user speech, footsteps, user movement, and/or user interaction with the environment, which may indicate presence of a user. By way of other examples, image data may be analyzed to detect movement in the environment, and/or device-beaconing data from a user device may indicate that the user device is present in the environment.

In situations where the primary device 102 is determined to be authorized to establish a non-bonded connection with the secondary device 104, and where presence of a user is detected, the command generator 154 may be utilized to generate a command for the primary device 102 to establish the non-bonded connection. The command may cause the primary device 102 to utilize the security credentials previously sent to the primary device 102 to establish the non-bonded connection. In some examples, instead of sending a command, the remote system 106 may send an indication that the connection is authorized, and the primary device 102 may utilize that indication to establish the non-bonded connection. To establish the non-bonded connection, the connection component 130 of the primary device 102 and the secondary device 104 may utilize a short-range network and protocols associated with that network, such as Bluetooth Low Energy, to send and receive data, but without the requirement of pairing and without transmitting data via a link layer of the network.

In these examples where a non-bonded connection is established, transmission of data between the devices may utilize encryption means that differ at least in part from bonded connections. For example, in a typical bonded connection, data encryption occurs at the link layer of the network. However, in a non-bonded connection where the link layer is not utilized, data transmitted between devices may be encrypted at the network layer and at the application layer. The network-layer encryption may promote secure communication between devices over the network in question. The application-layer encryption may promote secure communication between applications running on the primary device and the secondary device. In other examples, double encryption may be performed at the application layer and at the presentation layer of the network. In these examples, the application-layer encryption may promote secure communication between applications running on the primary device 102 and the secondary device 104. The presentation-layer encryption may promote secure communications for data translation for the network. The encryption component 128 of the primary device 102 may be configured to apply this encryption scheme for data transmitted between the primary device 102 and the secondary device 104. By so doing, the primary device 102 and the secondary device 104 may transmit data to and from each other in a secure manner without needing to pair the devices 102, 104 or otherwise engage in setting up the devices 102, 104 to work with each other. This process may be repeated as the user moves from space to space, connecting and disconnecting from primary devices 102 as the user travels to spaces with authorized primary devices 102 and presence of the user is detected.

In addition to, or instead of, presence confirmation operations as described herein, other confirmatory operations may be performed. For example, the primary device 102 and/or the remote system 106 may determine that the wireless beacon as transmitted from the secondary device 104 is received at the primary device 102 for at least a threshold amount of time. For example, for certain primary devices 102, if the user moves past the primary device 102 but then continues on to another space, connection to the primary device 102 may not be desirable. As such, connection to the primary device 102 may occur, in these examples, when the wireless beacon is received at the primary device 102 for at least the threshold amount of time, such as, for example, for at least 10 seconds. In still other examples, a RSSI value may be utilized. For example, it may be desirable to connect to a primary device 102 when the secondary device 104 is sufficiently close to the primary device 102. The primary device 102 may receive the wireless beacon and an RSSI value associated with the received wireless beacon may be determined. In examples, when the RSSI value satisfies a threshold RSSI value, the primary device 102 may establish the non-bonded connection with the secondary device 104. It should be understood that one, some, or all of the confirmatory processes described herein may be performed. In examples, these processes may increase a confidence level that the primary device 102 and the secondary device 104 should be connected.

It should be noted that while text data is described as a type of data utilized to communicate between various components of the remote system 106 and/or other systems and/or devices, the components of the remote system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102, 104.

As shown in FIG. 1, several of the components of the remote system 106 and the associated functionality of those components as described herein may be performed by one or more of the devices 102, 104. Additionally, or alternatively, some or all of the components and/or functionalities associated with the devices 102, 104 may be performed by the remote system 106.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110, 132, and/or the processor(s) described with respect to the components of the remote system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110, 132, and/or the processor(s) described with respect to the components of the remote system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110, 132, and/or the processor(s) described with respect to the components of the remote system 106 may possess its own local memory, which also may store program components, program data, and/or one or more operating systems.

The memory 114, 136, and/or the memory described with respect to the components of the remote system 106 may include volatile and nonvolatile memory, removable and non-removable media implemented in any method or technology for storage of information, such as computer-readable instructions, data structures, program component, or other data. Such memory 112 and/or the memory described with respect to the components of the remote system 104 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114, 136, and/or the memory described with respect to the components of the remote system 106 may be implemented as computer-readable storage media ("CRSM"), which may be any available physical media accessible by the processor(s) 110, 132, and/or the processor(s) described with respect to the remote system 106 to execute instructions stored on the memory 114, 136, and/or the memory described with respect to the components of the remote system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114, 136, and/or the memory described with respect to the components of the remote system 106, discussed herein may include at least one operating system (OS) component that is configured to manage hardware resource devices such as the network interface(s), the I/O devices of the respective apparatuses, and so forth, and provide various services to applications or components executing on the processors.

Such OS component may implement a variant of the FreeBSD operating system as promulgated by the FreeBSD Project: other UNIX or UNIX-like variants: a variation of the Linux operating system as promulgated by Linus Torvalds: the FireOS operating system from Amazon.com Inc. of Seattle, Washington, USA: the Windows operating system from Microsoft Corporation of Redmond, Washington, USA: LynxOS as promulgated by Lynx Software Technologies, Inc. of San Jose, California: Operating System Embedded (Enea OSE) as promulgated by ENEA AB of Sweden; and so forth.

The network interface(s) 112, 134, and/or the network interface(s) described with respect to the components of the remote system 106 may enable messages between the components and/or devices shown in system 100 and/or with one or more other polling systems, as well as other networked devices. Such network interface(s) 112, 134, and/or the network interface(s) described with respect to the components of the remote system 106 may include one or more network interface controllers (NICs) or other types of transceiver devices to send and receive messages over the network 108.

For instance, each of the network interface(s) 112, 134, and/or the network interface(s) described with respect to the components of the remote system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112, 134, and/or the network interface(s) described with respect to the components of the remote system 106 may include a wide area network (WAN) component to enable message over a wide area network.

In some instances, the remote system 106 may be local to an environment associated the devices 102, 104. For instance, the remote system 106 may be located within one or more of the devices 102, 104. In some instances, some or all of the functionality of the remote system 106 may be performed by one or more of the devices 102, 104. Also, while various components of the remote system 106 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device in a home and/or office environment, a self-driving automobile, a bus, an airplane, a camper, a trailer, and/or other similar object having a computer to perform its own sensor processing, etc.

Figure 2:
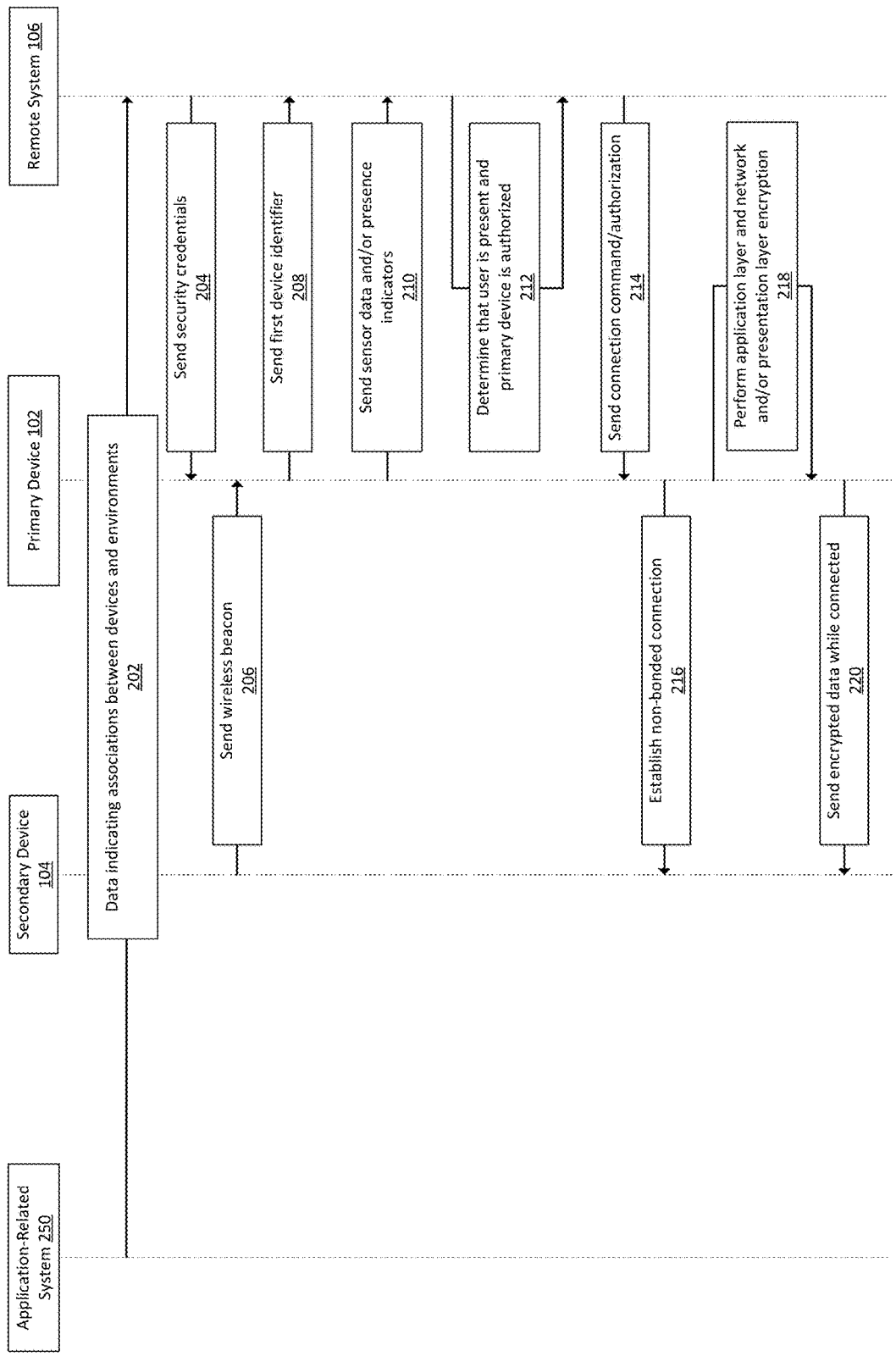
FIG. 2 illustrates a sequence diagram of example operations for pairing-less device connectivity.

FIG. 2 illustrates a sequence diagram of example operations for pairing-less device connectivity. The order of operations described in FIG. 2 is provided by way of example, and not as a limitation. Some or all of the operations may be performed in a different order and/or in parallel.

At block 202, an application-related system 250 may send data indicating associations between devices and/or environments to a remote system 106 associated with one or more primary devices 102. For example, the data may indicate one or more associations between primary devices 102 and secondary devices 104. For example, a given secondary device 104 may be associated with an application and system for operation of the secondary device 104. In these examples, the application may be utilized to register the secondary device 104, including gathering information including the device identifier for the secondary device 104, the user device where the application is installed and/or accessed, an identifier of an enterprise and/or enterprise system associated with the secondary device 104, an identifier of a given environment associated with the user, and/or limitations on associations between a user and environments, such as a duration of when the user is associated with an environment. Acquisition of the this association data, and/or the registration of a secondary device 104 as described herein may be performed in multiple ways. For example, a visual device indicator may be provided on the secondary device 104 and the user may provide user input to the application corresponding to the visual device indicator. In other examples, a code of the secondary device 104 may be scannable to acquire the device identifier. In still other examples, near-field communication techniques may be utilized to acquire the device identifier. Additionally, associations between the secondary device 104 and the environments at issue and/or accounts associated with a user may be acquired by user input to the application, by querying a system associated with the environment, and/or by querying systems associated with the secondary device 104. By way of example, the secondary device 104 may be a wearable device that is acquired in association with a guest checking in at a hotel. The identifier of the secondary device 104 may be associated with the guest, with the room the guest is staying at, with the hotel the guest is staying at, and/or one or more attractions and/or events that the guest has registered for. Data indicating these associations may be received at the remote system 106, from the system associated with the environment, and/or from one or more other systems associated with the secondary device 104 and/or the environment.

At block 204, the remote system 106 may send security credentials to a group of the primary devices 102 indicated by the association data to be associated with a given secondary device 104. For example, the remote system 106 may receive the association data, and a security component may determine a group of primary devices 102 that the secondary device 104 is authorized to establish a non-bonded connection to. For example, utilizing the hotel example above, the security component may identify a first primary device 102 associated with the room the guest is staying at, primary devices 102 associated with a communal space of the hotel, and primary devices 102 associated with an attraction of the hotel. The remote system 106 may store, in a user registry or other database, an indication of the group of the primary devices 102 for which the secondary device 104 is authorized to establish a non-bonded connection with. The security component may also send, to some or all of the primary devices 102, security credentials to be utilized for establishing the non-bonded connection with the secondary device 102. In addition to the security credentials sent to the group of primary devices 102, the secondary devices 104 may be manufactured or otherwise may have installed thereon security credentials for establishing the non-bonded connections.

At block 206, the secondary device 104 may send a wireless beacon that may be received at the primary device 102. For example, a user may transport, such as by wearing and walking, the secondary device 104 from location to location. The secondary device 104 may emit a wireless beacon periodically or otherwise repeatedly. When the secondary device 104 comes into proximity of the primary device 102 such that the primary device 102 receives the wireless beacon, the primary device 102 may initiate establishing the non-bonded connection between the devices.

At block 208, the primary device 102 may send a device identifier included in the wireless beacon to the remote system 106. For example, an identifier of the secondary device 104 may be included in the wireless beacon and data indicating the identifier of the secondary device 104 may be sent to the remote system 106. A beaconing component of the remote system 106 may receive the data from the primary device 102 and determine whether the primary device 102 is authorized to establish a non-bonded connection with the secondary device 104. In examples where the beaconing component determines that the primary device 102 is not authorized, the remote system 106 may send a response to the primary device 102 indicating that a connection is not to be established. Utilizing the hotel example above, a user may walk down a hallway of a hotel, and as the user walks with the secondary device 104, multiple primary devices 102 may receive the wireless beacon from the secondary device 104. However, as the user walks by rooms that are not assigned to the user, the primary devices 102 in those rooms will not connect to the secondary device 104. When the user reaches her/his room, the primary device 102 situated in that room may receive the wireless beacon from the secondary device 104 and the beaconing component of the remote system 106 may determine that the primary device 102 is authorized to establish a non-bonded connection with the secondary device 104. It should be understood that instead of sending device identifiers to the remote system 106, the primary device 102 may include the functionality for comparing the device identifier from the secondary device 104 with data indicating which secondary device identifiers are authorized for establishing the non-bonded connection.

At block 210, the primary device 102 may send sensor data and/or presence indicators to the remote system 106. For example, prior to establishing the non-bonded connection, the remote system 106 may perform one or more presence confirmation operations to confirm that a user associated with the secondary device 104 is present in the environment where the primary device is situated. Again utilizing the hotel example, a hotel room may have multiple spaces each having their own primary device 102, but the user and the secondary device 104 may be located in just one of those spaces. In this example, the primary devices 102 in all of the spaces may detect the wireless beacon, but a connection would be desirable to just the device where the user is present. To perform the presence confirmation operations, sensor data may be received from the environment in question. The sensor data may be received from any sensor associated with the environment, including, for example, a microphone, a camera, a thermometer, etc. The sensor data may also be received from one or more devices associated with the environment, such as a user device associated with the user, door locks, etc.

At block 212, the remote system 106 may determine that a user is present and the primary device 102 is authorized to establish a non-bonded connection with the secondary device 104. For example, the sensor data may be analyzed by a presence component to determine whether a user is present in the environment where the primary device 102 at issue is disposed. For example, the presence component may utilize audio data from a microphone of the environment to identify the presence of user speech, footsteps, user movement, and/or user interaction with the environment, which may indicate presence of a user. By way of other examples, image data may be analyzed to detect movement in the environment, and/or device-beaconing data from a user device may indicate that the user device is present in the environment. It should be understood that instead of, or in addition to, the remote system 106 performing the presence confirmation operations, the primary device 102 may be configured to perform these operations and to determine whether a user is present for establishing a non-bonded connection with the secondary device 104.

In addition to, or instead of, presence confirmation operations as described herein, other confirmatory operations may be performed. For example, the primary device 102 and/or the remote system 106 may determine that the wireless beacon as transmitted from the secondary device 104 is received at the primary device 102 for at least a threshold amount of time. For example, for certain primary devices 102, if the user moves past the primary device 102 but then continues on to another space, connection to the primary device 102 may not be desirable. As such, connection to the primary device 102 may occur, in these examples, when the wireless beacon is received at the primary device 102 for at least the threshold amount of time, such as, for example, for at least 10 seconds. In still other examples, a RSSI value may be utilized. For example, it may be desirable to connect to a primary device 102 when the secondary device 104 is sufficiently close to the primary device 102. The primary device 102 may receive the wireless beacon and an RSSI value associated with the received wireless beacon may be determined. In examples, when the RSSI value satisfies a threshold RSSI value, the primary device 102 may establish the non-bonded connection with the secondary device 104. It should be understood that one, some, or all of the confirmatory processes described herein may be performed. In examples, these processes may increase a confidence level that the primary device 102 and the secondary device 104 should be connected.

At block 214, the remote system 106 may send a connection command and/or an authorization indication to the primary device 102. For example, in situations where the primary device 102 is determined to be authorized to establish a non-bonded connection with the secondary device 104, and where presence of a user is detected, a command generator may be utilized to generate a command for the primary device 102 to establish the non-bonded connection. The command may cause the primary device 102 to utilize the security credentials previously sent to the primary device 102 to establish the non-bonded connection. In some examples, instead of sending a command, the remote system 106 may send an indication that the connection is authorized, and the primary device 102 may utilize that indication to establish the non-bonded connection.

At block 216, the primary device 102 may establish a non-bonded connection with the secondary device 104. For example, to establish the non-bonded connection, a connection component of the primary device 102 and the secondary device 104 may utilize a short-range network and protocols associated with that network, such as Bluetooth Low Energy, to send and receive data, but without the requirement of pairing and without transmitting data via a link layer of the network. Establishment of a non-bonded connection, as described herein, may include utilizing any short-range connection protocol, but without the requirement for one or more of the devices to perform pairing operations and/or for the primary device 102 to maintain an identifier of the secondary device 104 and/or connection information associated with the secondary device 104 in a queue of paired devices. It these examples when pairing does not occur, some functionality that would be otherwise available when devices are paired may not be available. This functionality may include the ability to utilize a link layer of the network to perform encryption of communications between devices for security purposes. As such, different encryption processes may be performed when non-bonded connections are made, as described below:

At block 218, the primary device 102 may perform network layer and application layer encryption of data to be sent from the primary device 102 to the secondary device 104. In these examples where a non-bonded connection is established, transmission of data between the devices may utilize encryption means that differ at least in part from bonded connections. For example, in a typical bonded connection, data encryption occurs at the link layer of the network. However, in a non-bonded connection where the link layer is not utilized, data transmitted between devices may be encrypted at the network layer and at the application layer. The network-layer encryption may promote secure communication between devices over the network in question. The application-layer encryption may promote secure communication between applications running on the primary device and the secondary device. An encryption component of the primary device 102 may be configured to apply this encryption scheme for data transmitted between the primary device 102 and the secondary device 104. In other examples, double encryption may be performed at the application layer and at the presentation layer of the network. In these examples, the application-layer encryption may promote secure communication between applications running on the primary device 102 and the secondary device 104. The presentation-layer encryption may promote secure communications for data translation for the network.

At block 220, the primary device 102 may send encrypted data to the secondary device 104 while the non-bonded connection is established. For example, the primary device 102 and the secondary device 104 may transmit data to and from each other in a secure manner without needing to pair the devices 102, 104 or otherwise engage in setting up the devices 102, 104 to work with each other. This process may be repeated as the user moves from space to space, connecting and disconnecting from primary devices 102 as the user travels to spaces with authorized primary devices 102 and presence of the user is detected.

Figure 3:
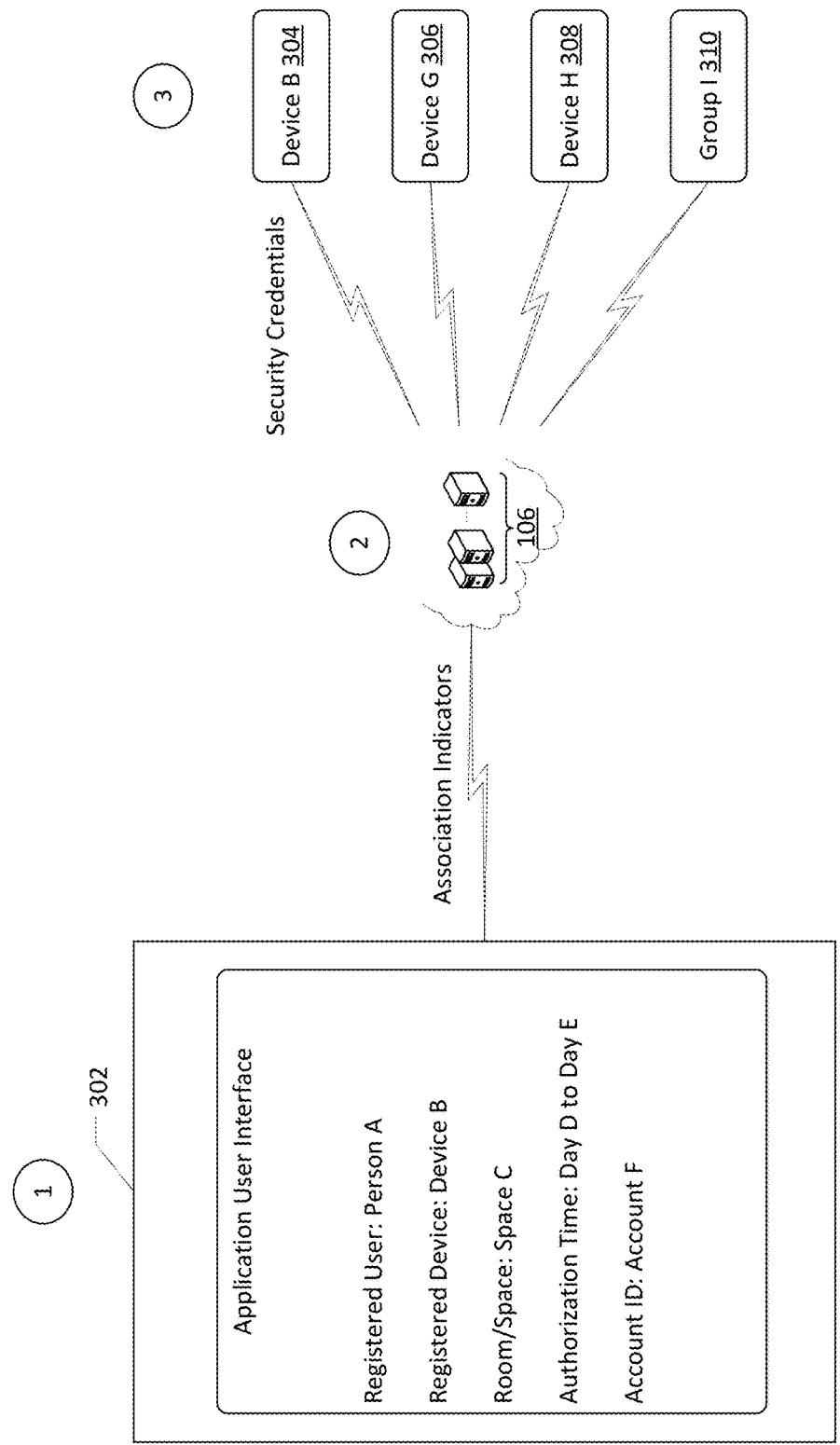
FIG. 3 illustrates a conceptual diagram of a user interface for acquiring device association indicators and distributing security credentials for pairing-less device connectivity.

FIG. 3 illustrates a conceptual diagram of a user interface for acquiring device association indicators and distributing security credentials for pairing-less device connectivity. It should be understood that the means for acquiring association data as described with respect to FIG. 3 is one example of association data acquisition. Other methodologies, as described herein, are also possible. The acquisition of association data as illustrated in FIG. 3 is described utilizing steps 1-3, but it should be understood that additional or other steps may be utilized.

At step 1, an application user interface 302 is utilized to receive user input on associations between devices and environments. The user interface 302 is provided by way of example, and other interfaces for receiving user input are included in this disclosure. Continuing with the hotel example expressed herein, the user interface may include input fields for receiving user input. Those input fields may allow for the user to provide information identifying the user, identifying a given secondary device, identifying a room and/or space associated with the user, identifying an authorization time and/or day, and/or identifying an account identifier associated with the user.

In examples, the application may be utilized to register the secondary device, including gathering information including the device identifier for the secondary device, the user device where the application is installed and/or accessed, an identifier of an enterprise and/or enterprise system associated with the secondary device, an identifier of a given environment associated with the user, and/or limitations on associations between a user and environments, such as a duration of when the user is associated with an environment. Acquisition of the this association data, and/or the registration of a secondary device as described herein may be performed in multiple ways. For example, a visual device indicator may be provided on the secondary device and the user may provide user input to the application corresponding to the visual device indicator. In other examples, a code of the secondary device may be scannable to acquire the device identifier. In still other examples, near-field communication techniques may be utilized to acquire the device identifier. Additionally, associations between the secondary device and the environments at issue and/or accounts associated with a user may be acquired by user input to the application, by querying a system associated with the environment, and/or by querying systems associated with the secondary device. By way of example, the secondary device may be a wearable device that is acquired in association with a guest checking in at a hotel. The identifier of the secondary device may be associated with the guest, with the room the guest is staying at, with the hotel the guest is staying at, and/or one or more attractions and/or events that the guest has registered for.

At step 2, data indicating these associations may be received at the remote system, from the system associated with the environment, and/or from one or more other systems associated with the secondary device and/or the environment. For example, the remote system may receive the association data, and a security component may determine a group of primary devices that the secondary device is authorized to establish a non-bonded connection to. For example, utilizing the hotel example above, the security component may identify a first primary device associated with the room the guest is staying at, primary devices associated with a communal space of the hotel, and primary devices associated with an attraction of the hotel. The remote system may store, in a user registry or other database, an indication of the group of the primary devices for which the secondary device is authorized to establish a non-bonded connection with.

At step 3, the security component may also send, to some or all of the primary devices, security credentials to be utilized for establishing the non-bonded connection with the secondary device. In addition to the security credentials sent to the group of primary devices, the secondary devices may be manufactured or otherwise may have installed thereon security credentials for establishing the non-bonded connections. The non-bonded connections may only be established when both the primary device and the secondary device have security credentials that allow for such connections. The security credentials, as described herein, may include one or more public and/or private keys, one or more security policies, one or more security certificates, and/or other security components that each device involved in the non-bonded connection will need to establish the connection. A security component of the secondary device may store the security credentials for the secondary device, and a security component of the primary device may store the security credentials for the primary device. For example, the remote system may have determined that Devices B, G, and H 304-308 and Group I 310 are authorized to establish non-bonded connections with a given secondary device. Group I 310 may represent a group identifier for a device group having multiple primary devices associated with it.

Figure 4:
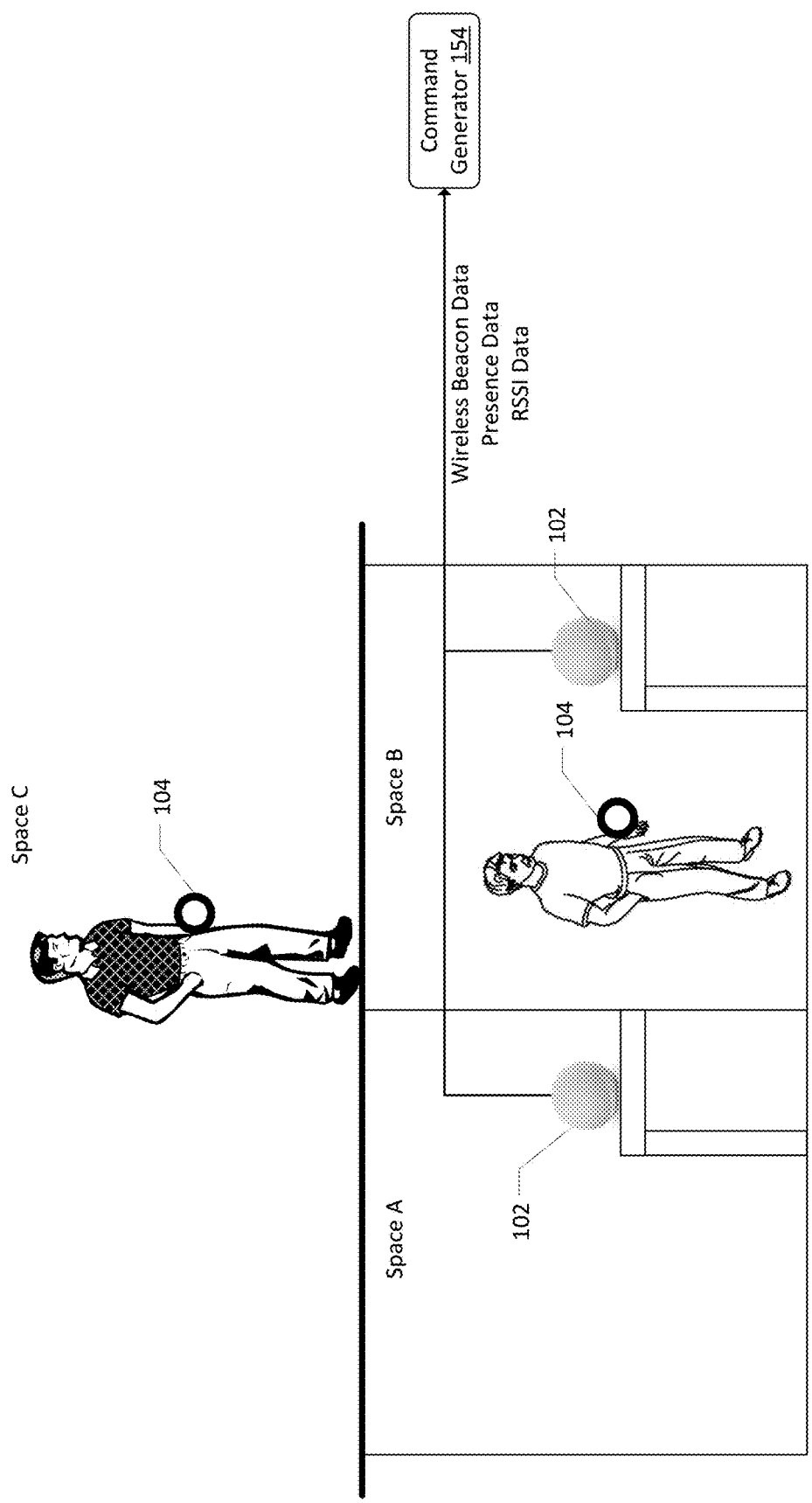
FIG. 4 illustrates a conceptual diagram for utilizing presence data, signal strength data, and wireless beacon data for pairing-less device connectivity.

FIG. 4 illustrates a conceptual diagram for utilizing presence data, signal strength data, and wireless beacon data for pairing-less device connectivity. The environment of FIG. 4 includes Space A, Space B, and Space C, as well as two secondary devices 104 and two primary devices 102. FIG. 4 illustrates a scenario where multiple secondary devices 104 are close enough to primary devices 102 such that the primary devices 102 receive wireless beacons transmitted from both secondary devices 104. Determinations are made as to which primary device 102 is authorized to establish a non-bonded connection with a given secondary device 104, as well as performance of presence confirmation operations as described herein.

For example, the user in Space B has a secondary device 104 and the primary devices 102 in Space B and Space A receive the wireless beacon from the secondary device 104. In examples, the remote system described herein may determine that both primary devices 102 are authorized to establish a non-bonded connection with the secondary device 104. However, in this example, the user is only present in Space B, not Space A. The presence confirmation operations described herein may be utilized to detect user presence in Space B and to determine that user presence is not detected in Space A. As such, the remote system may determine that the non-bonded connection is to be established between the primary device 102 in Space B and the secondary device 104, instead of with the primary device 102 in Space A. Additionally confirmatory operations may also be performed, such as the use of RSSI values to determine that the secondary device 104 is nearer to the primary device 102 in Space B than the primary device 102 in Space A.

In situations where the primary device 102 is determined to be authorized to establish a non-bonded connection with the secondary device 104, and where presence of a user is detected, the command generator may be utilized to generate a command for the primary device 102 to establish the non-bonded connection. The command may cause the primary device 102 to utilize the security credentials previously sent to the primary device 102 to establish the non-bonded connection. In some examples, instead of sending a command, the remote system 106 may send an indication that the connection is authorized, and the primary device 102 may utilize that indication to establish the non-bonded connection. To establish the non-bonded connection, a connection component of the primary device 102 and the secondary device 104 may utilize a short-range network and protocols associated with that network, such as Bluetooth Low Energy, to send and receive data, but without the requirement of pairing and without transmitting data via a link layer of the network.

By way of additional example, the user in Space C may have a secondary device 104, and the primary devices 102 in Space A and Space B may receive a wireless beacon from the secondary device 104 of this user. In this example, the remote system may compare a device identifier of the secondary device 104 as received in the wireless beacon to device identifiers for the primary devices 102 to determine whether one or more of the primary devices 102 are authorized. In this example, neither of the primary devices 102 are authorized to establish a non-bonded connection with the secondary device 104, and in these examples the remote system 106 may determine to refrain from sending a connection command or authorization indication to the primary devices 102. In other examples, the remote system 106 may send an indication to the primary devices 102 that establishing a connection is not authorized.

As shown in FIG. 4, in addition to wireless beacon data and/or presence data, RSSI data may also be utilized to determine whether a non-bonded connection with the secondary device 104 is to be established. For example, high RSSI values may indicate that the secondary device 104 is closer to the primary device 102 than when lower RSSI values are present. By way of example, when RSSI values are measured in terms of decibel-milliwatts (dBms), a dBm of −40 to −50 may be considered a strong RSSI value indicating the secondary device 104 and the primary device 102 are close to each other, such as in the same room. As the secondary device 104 moves away from the primary device 102 and/or when interference between the two devices occurs, such as because of other devices and/or objects interfering with communication signals, the RSSI values may drop. For example, an RSSI value of −70 dBm or lower may indicate a poor signal strength.

Figure 5:
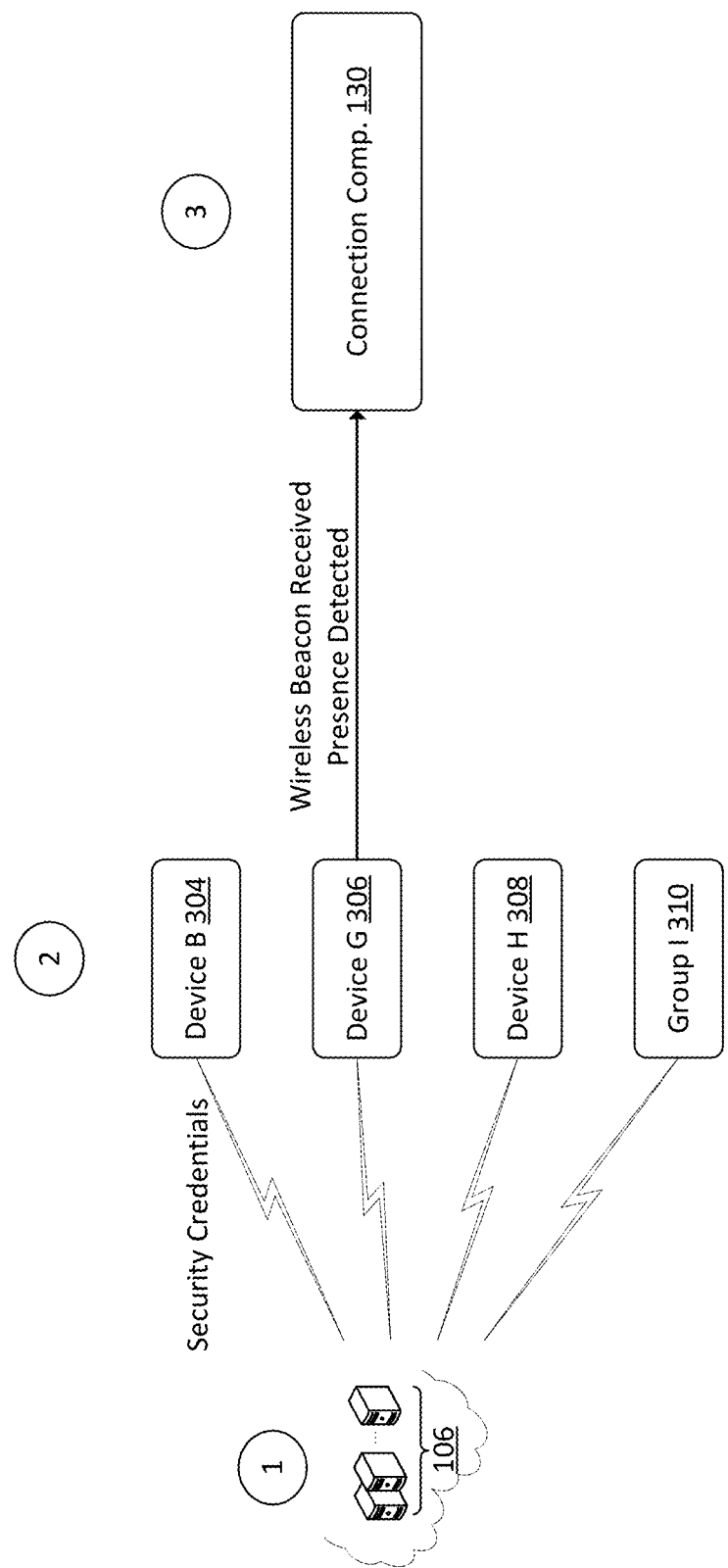

FIG. 5 illustrates a conceptual diagram for selecting an authorized device for establishing a pairing-less connection with. The selection of authorized devices as illustrated in FIG. 5 is described utilizing steps 1-3, but it should be understood that additional or other steps may be utilized.

At step 1, data indicating associations between devices and/or environments may be received at the remote system, from the system associated with the environment, and/or from one or more other systems associated with the secondary device and/or the environment. For example, the remote system may receive the association data, and a security component may determine a group of primary devices that the secondary device is authorized to establish a non-bonded connection to. For example, utilizing the hotel example above, the security component may identify a first primary device associated with the room the guest is staying at, primary devices associated with a communal space of the hotel, and primary devices associated with an attraction of the hotel. The remote system may store, in a user registry or other database, an indication of the group of the primary devices for which the secondary device is authorized to establish a non-bonded connection with.

At step 2, the security component may also send, to some or all of the primary devices, security credentials to be utilized for establishing the non-bonded connection with the secondary device. In addition to the security credentials sent to the group of primary devices, the secondary devices may be manufactured or otherwise may have installed thereon security credentials for establishing the non-bonded connections. The non-bonded connections may only be established when both the primary device and the secondary device have security credentials that allow for such connections. The security credentials, as described herein, may include one or more public and/or private keys, one or more security policies, one or more security certificates, and/or other security components that each device involved in the non-bonded connection will need to establish the connection. A security component of the secondary device may store the security credentials for the secondary device, and a security component of the primary device may store the security credentials for the primary device. For example, the remote system may have determined that Devices B, G, and H 304-308 and Group I 310 are authorized to establish non-bonded connections with a given secondary device. Group I 310 may represent a group identifier for a device group having multiple primary devices associated with it.

At step 3, a given secondary device, here Device C 306 may send a wireless beacon that may be received at the primary device. When the secondary device comes into proximity of the primary device such that the primary device receives the wireless beacon, the primary device may initiate establishing the non-bonded connection between the devices. The primary device may send a device identifier included in the wireless beacon to the remote system. For example, an identifier of the secondary device may be included in the wireless beacon and data indicating the identifier of the secondary device may be sent to the remote system. A beaconing component of the remote system may receive the data from the primary device and determine whether the primary device is authorized to establish a non-bonded connection with the secondary device. In examples where the beaconing component determines that the primary device is not authorized, the remote system may send a response to the primary device indicating that a connection is not to be established. Utilizing the hotel example above, a user may walk down a hallway of a hotel, and as the user walks with the secondary device, multiple primary devices may receive the wireless beacon from the secondary device. However, as the user walks by rooms that are not assigned to the user, the primary devices in those rooms will not connect to the secondary device. When the user reaches her/his room, the primary device situated in that room may receive the wireless beacon from the secondary device and the beaconing component of the remote system may determine that the primary device is authorized to establish a non-bonded connection with the secondary device.

The primary device may send sensor data and/or presence indicators to the remote system. For example, prior to establishing the non-bonded connection, the remote system may perform one or more presence confirmation operations to confirm that a user associated with the secondary device is present in the environment where the primary device is situated. Again utilizing the hotel example, a hotel room may have multiple spaces each having their own primary device, but the user and the secondary device may be located in just one of those spaces. In this example, the primary devices in all of the spaces may detect the wireless beacon, but a connection would be desirable to just the device where the user is present. To perform the presence confirmation operations, sensor data may be received from the environment in question. The sensor data may be received from any sensor associated with the environment, including, for example, a microphone, a camera, a thermometer, etc. The sensor data may also be received from one or more devices associated with the environment, such as a user device associated with the user, door locks, etc.

The remote system may determine that a user is present and the primary device is authorized to establish a non-bonded connection with the secondary device. To establish the non-bonded connection, a connection component 130 of the primary device and the secondary device may utilize a short-range network and protocols associated with that network, such as Bluetooth Low Energy, to send and receive data, but without the requirement of pairing and without transmitting data via a link layer of the network.

Figure 6:
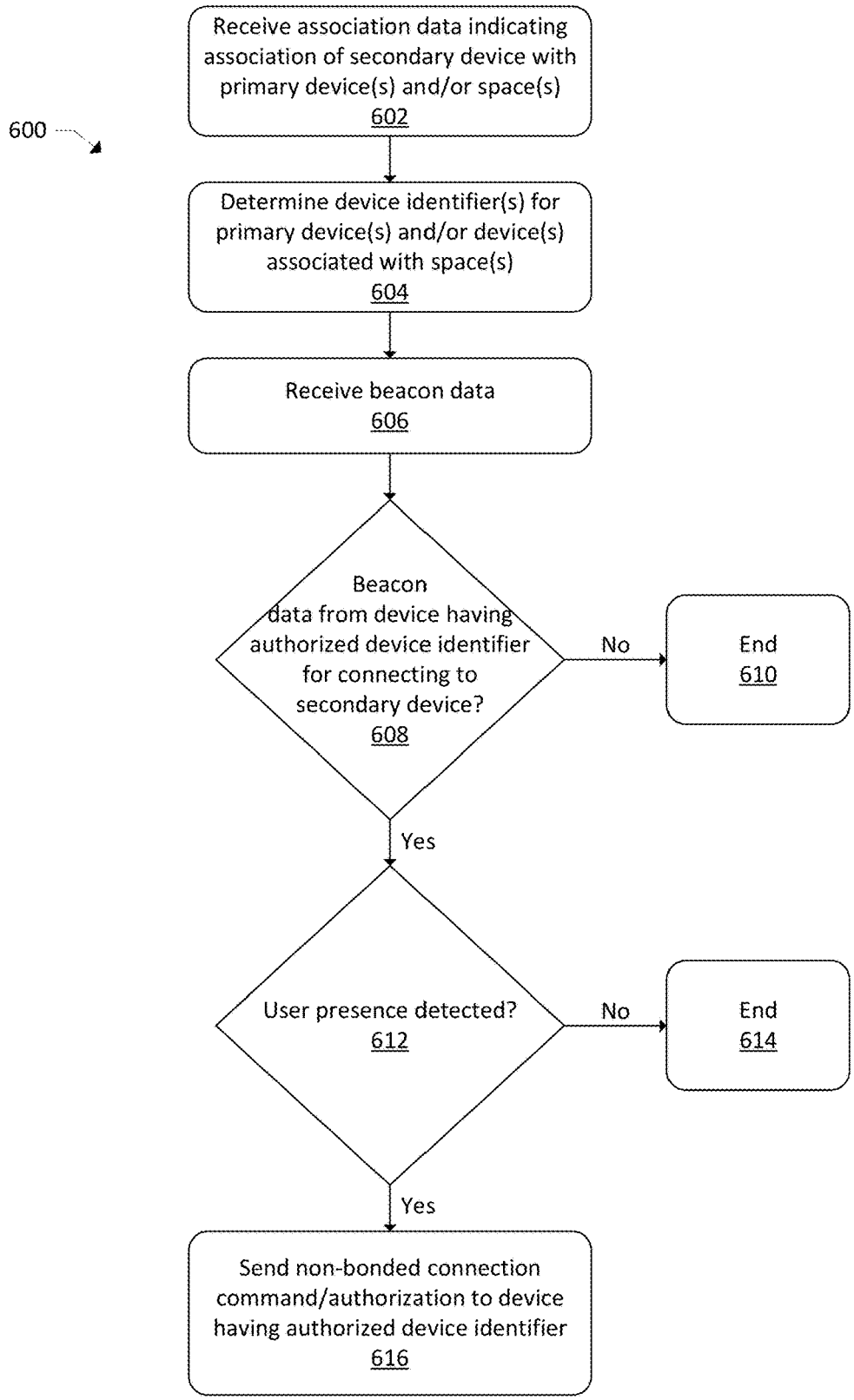
FIG. 6 illustrates a flow diagram of an example process for connecting devices without pairing utilizing wireless beacon data and presence data.
Figure 7:
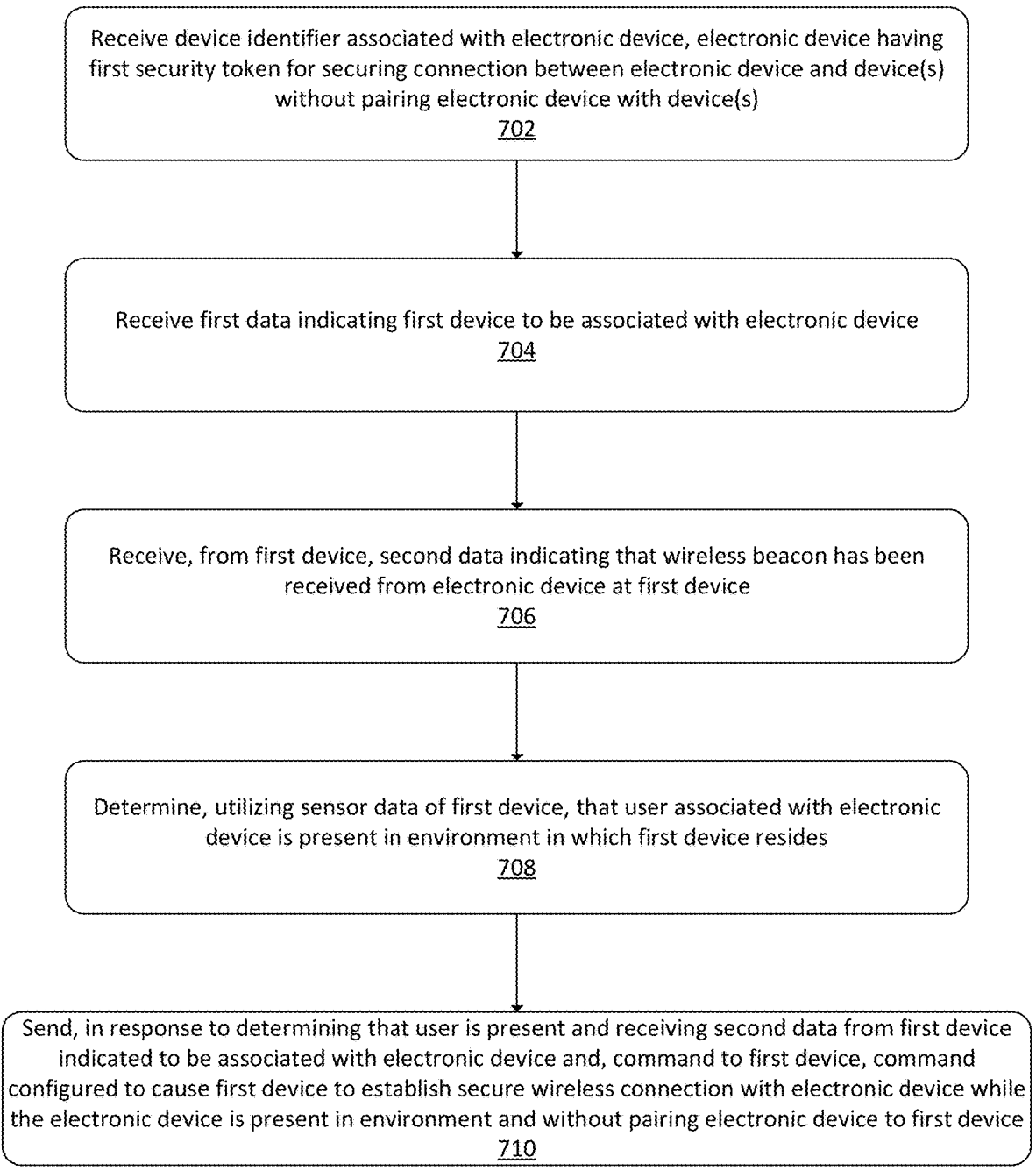
FIG. 7 illustrates a flow diagram of an example process for pairing-less device connectivity.
Figure 8:
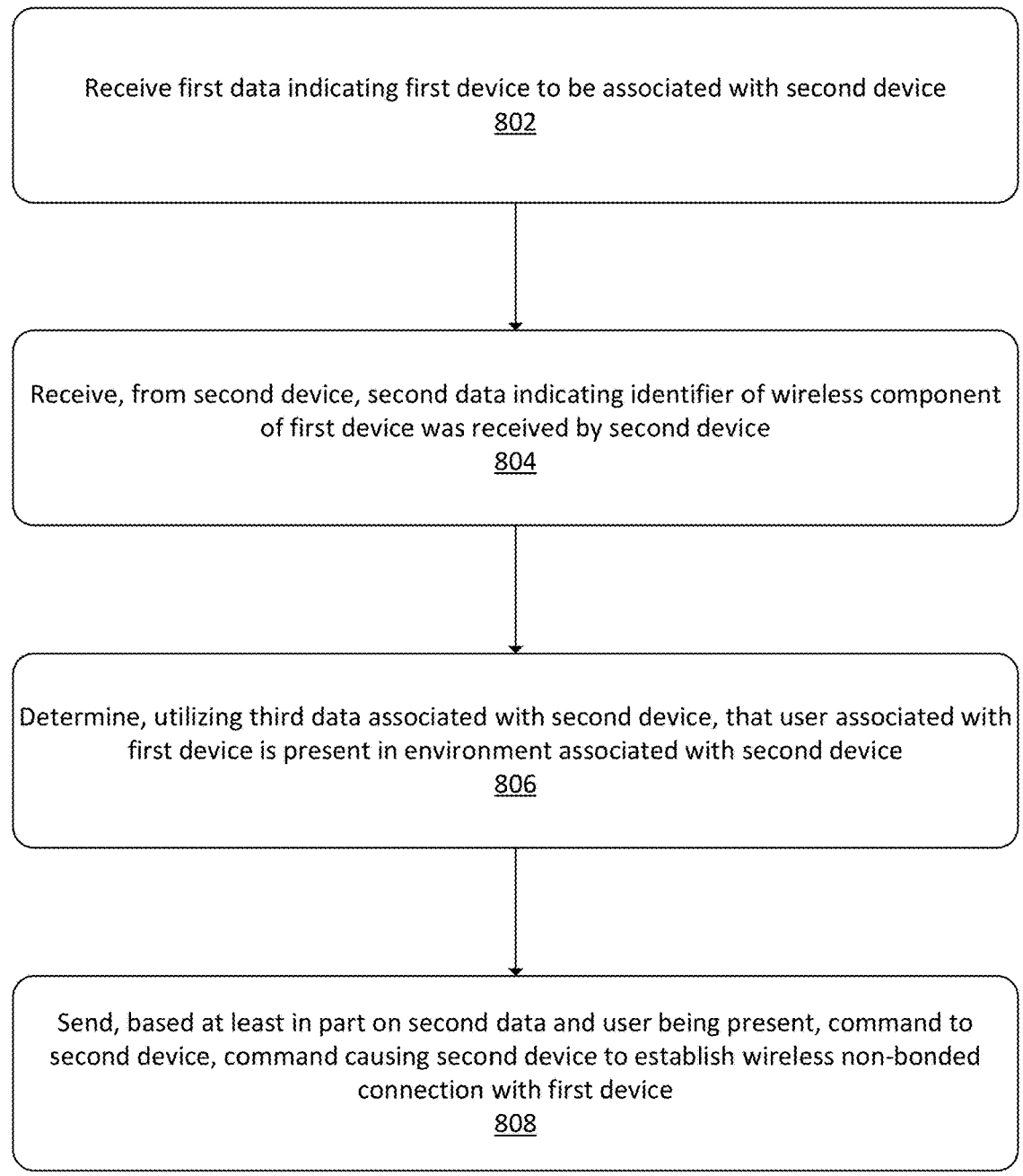
FIG. 8 illustrates a flow diagram of another example process for pairing-less device connectivity.

FIGS. 6-8 illustrates processes for pairing-less device connectivity. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5 and 9-11, although the processes may be implemented in a wide variety of other environments, architectures and systems.

FIG. 6 illustrates a flow diagram of an example process 600 for connecting devices without pairing utilizing wireless beacon data and presence data. The order in which the operations or steps are described is not intended to be construed as a limitation, and any number of the described operations may be combined in any order and/or in parallel to implement process 600.

At block 602, the process 600 may include receiving association data indicating association(s) of a secondary devices with one or more primary devices and/or one or more spaces. For example, the data may indicate one or more associations between primary devices and secondary devices. For example, a given secondary device may be associated with an application and system for operation of the secondary device. In these examples, the application may be utilized to register the secondary device, including gathering information including the device identifier for the secondary device, the user device where the application is installed and/or accessed, an identifier of an enterprise and/or enterprise system associated with the secondary device, an identifier of a given environment associated with the user, and/or limitations on associations between a user and environments, such as a duration of when the user is associated with an environment. Acquisition of the this association data, and/or the registration of a secondary device as described herein may be performed in multiple ways. For example, a visual device indicator may be provided on the secondary device and the user may provide user input to the application corresponding to the visual device indicator. In other examples, a code of the secondary device may be scannable to acquire the device identifier. In still other examples, near-field communication techniques may be utilized to acquire the device identifier. Additionally, associations between the secondary device and the environments at issue and/or accounts associated with a user may be acquired by user input to the application, by querying a system associated with the environment, and/or by querying systems associated with the secondary device. By way of example, the secondary device may be a wearable device that is acquired in association with a guest checking in at a hotel. The identifier of the secondary device may be associated with the guest, with the room the guest is staying at, with the hotel the guest is staying at, and/or one or more attractions and/or events that the guest has registered for. Data indicating these associations may be received at the remote system, from the system associated with the environment, and/or from one or more other systems associated with the secondary device and/or the environment.

At block 604, the process 600 may include determining device identifiers for the one or more primary devices and/or environment identifiers. For example, the association data may be utilized to determine the device identifiers for the primary devices identified by user input or by a system associated with the environment. Additionally, when environment identifiers are provided, such as room numbers for example, the system may determine which primary devices are associated with the environment identifiers, and determine the device identifiers associated with those primary devices.

At block 606, the process 600 may include receiving beacon data from a primary device. For example, a user may transport, such as by wearing and walking, the secondary device from location to location. The secondary device may emit a wireless beacon periodically or otherwise repeatedly. When the secondary device comes into proximity of the primary device such that the primary device receives the wireless beacon, the primary device may initiate establishing the non-bonded connection between the devices.

At block 608, the process 600 may include determining whether the beacon data is from a primary device having an authorized device identifier for connecting to the secondary device from which the wireless beacon was transmitted. For example, the remote system may compare the identifier of the secondary device and the primary device to a database indicating authorized primary devices for connection to the secondary device. In examples, the identifier of the secondary device and/or the primary devices may rotate periodically, which may hinder nefarious actors and/or systems from interrupting and/or gaining access to connections between such devices.

In instances where the beacon data is not from a primary device having an authorized device identifier, the process 600 may end at block 610. In examples, the remote system may send an indication to the primary device that non-bonded connection with the secondary device is not authorized.

In instances where the beacon data is from a primary device having an authorized device identifier, at block 612, the process 600 may include determining whether user presence is detected in association with the primary device. For example, prior to establishing the non-bonded connection, the remote system may perform one or more presence confirmation operations to confirm that a user associated with the secondary device is present in the environment where the primary device is situated. Again utilizing the hotel example, a hotel room may have multiple spaces each having their own primary device, but the user and the secondary device may be located in just one of those spaces. In this example, the primary devices in all of the spaces may detect the wireless beacon, but a connection would be desirable to just the device where the user is present. To perform the presence confirmation operations, sensor data may be received from the environment in question. The sensor data may be received from any sensor associated with the environment, including, for example, a microphone, a camera, a thermometer, etc. The sensor data may also be received from one or more devices associated with the environment, such as a user device associated with the user, door locks, etc.

The sensor data may be analyzed by a presence component to determine whether a user is present in the environment where the primary device at issue is disposed. For example, the presence component may utilize audio data from a microphone of the environment to identify the presence of user speech, footsteps, user movement, and/or user interaction with the environment, which may indicate presence of a user. By way of other examples, image data may be analyzed to detect movement in the environment, and/or device-beaconing data from a user device may indicate that the user device is present in the environment.

In addition to, or instead of, presence confirmation operations as described herein, other confirmatory operations may be performed. For example, the primary device and/or the remote system may determine that the wireless beacon as transmitted from the secondary device is received at the primary device for at least a threshold amount of time. For example, for certain primary devices, if the user moves past the primary device but then continues on to another space, connection to the primary device may not be desirable. As such, connection to the primary device may occur, in these examples, when the wireless beacon is received at the primary device for at least the threshold amount of time, such as, for example, for at least 5 seconds. In still other examples, a RSSI value may be utilized. For example, it may be desirable to connect to a primary device when the secondary device is sufficiently close to the primary device. The primary device may receive the wireless beacon and an RSSI value associated with the received wireless beacon may be determined. In examples, when the RSSI value satisfies a threshold RSSI value, the primary device may establish the non-bonded connection with the secondary device. It should be understood that one, some, or all of the confirmatory processes described herein may be performed. In examples, these processes may increase a confidence level that the primary device and the secondary device should be connected.

In instances where user presence is not detected, the process 600 may end at block 614. In examples, the remote system may send an indication to the primary device that non-bonded connection with the secondary device is not permitted.

In instances where user presence is detected, at block 616, the process 600 may include sending a non-bonded connection command and/or an authorization indication to the primary device having the authorized device identifier. For example, in situations where the primary device is determined to be authorized to establish a non-bonded connection with the secondary device, and where presence of a user is detected, a command generator may be utilized to generate a command for the primary device to establish the non-bonded connection. The command may cause the primary device to utilize the security credentials previously sent to the primary device to establish the non-bonded connection. In some examples, instead of sending a command, the remote system may send an indication that the connection is authorized, and the primary device may utilize that indication to establish the non-bonded connection.

FIG. 7 illustrates a flow diagram of an example process 700 for pairing-less device connectivity. The order in which the operations or steps are described is not intended to be construed as a limitation, and any number of the described operations may be combined in any order and/or in parallel to implement process 700.

At block 702, the process 700 may include receiving a device identifier associated with an electronic device, the electronic device having a first security token for securing a connection between the electronic device and one or more devices without pairing the electronic device with the one or more devices. The device identifier may be received from the electronic device, from a system associated with the electronic device, from a system associated with an enterprise where the electronic device is sold and/or utilized, and/or from one or more other systems and/or devices. As used in FIG. 7, the electronic device may be described as a secondary device, and the first devices may be described as primary devices.

At block 704, the process 700 may include receiving first data indicating a first device to be associated with the electronic device. For example, a given secondary device may be associated with an application and system for operation of the secondary device. In these examples, the application may be utilized to register the secondary device, including gathering information including the device identifier for the secondary device, the user device where the application is installed and/or accessed, an identifier of an enterprise and/or enterprise system associated with the secondary device, an identifier of a given environment associated with the user, and/or limitations on associations between a user and environments, such as a duration of when the user is associated with an environment. Acquisition of the this association data, and/or the registration of a secondary device as described herein may be performed in multiple ways. For example, a visual device indicator may be provided on the secondary device and the user may provide user input to the application corresponding to the visual device indicator. In other examples, a code of the secondary device may be scannable to acquire the device identifier. In still other examples, near-field communication techniques may be utilized to acquire the device identifier. Additionally, associations between the secondary device and the environments at issue and/or accounts associated with a user may be acquired by user input to the application, by querying a system associated with the environment, and/or by querying systems associated with the secondary device. By way of example, the secondary device may be a wearable device that is acquired in association with a guest checking in at a hotel. The identifier of the secondary device may be associated with the guest, with the room the guest is staying at, with the hotel the guest is staying at, and/or one or more attractions and/or events that the guest has registered for. Data indicating these associations may be received at the remote system, from the system associated with the environment, and/or from one or more other systems associated with the secondary device and/or the environment.

At block 706, the process 700 may include receiving, from the first device, second data indicating that a wireless beacon has been received from the electronic device at the first device. For example, a user may transport, such as by wearing and walking, the secondary device from location to location. The secondary device may emit a wireless beacon periodically or otherwise repeatedly. When the secondary device comes into proximity of the primary device such that the primary device receives the wireless beacon, the primary device may initiate establishing the non-bonded connection between the devices.

At block 708, the process 700 may include determining, utilizing sensor data of the first device, that a user associated with the electronic device is present in an environment in which the first device resides. For example, prior to establishing the non-bonded connection, the remote system may perform one or more presence confirmation operations to confirm that a user associated with the secondary device is present in the environment where the primary device is situated. Again utilizing the hotel example, a hotel room may have multiple spaces each having their own primary device, but the user and the secondary device may be located in just one of those spaces. In this example, the primary devices in all of the spaces may detect the wireless beacon, but a connection would be desirable to just the device where the user is present. To perform the presence confirmation operations, sensor data may be received from the environment in question. The sensor data may be received from any sensor associated with the environment, including, for example, a microphone, a camera, a thermometer, etc. The sensor data may also be received from one or more devices associated with the environment, such as a user device associated with the user, door locks, etc.

The sensor data may be analyzed by a presence component to determine whether a user is present in the environment where the primary device at issue is disposed. For example, the presence component may utilize audio data from a microphone of the environment to identify the presence of user speech, footsteps, user movement, and/or user interaction with the environment, which may indicate presence of a user. By way of other examples, image data may be analyzed to detect movement in the environment, and/or device-beaconing data from a user device may indicate that the user device is present in the environment.

In addition to, or instead of, presence confirmation operations as described herein, other confirmatory operations may be performed. For example, the primary device and/or the remote system may determine that the wireless beacon as transmitted from the secondary device is received at the primary device for at least a threshold amount of time. For example, for certain primary devices, if the user moves past the primary device but then continues on to another space, connection to the primary device may not be desirable. As such, connection to the primary device may occur, in these examples, when the wireless beacon is received at the primary device for at least the threshold amount of time, such as, for example, for at least 5 seconds. In still other examples, a RSSI value may be utilized. For example, it may be desirable to connect to a primary device when the secondary device is sufficiently close to the primary device. The primary device may receive the wireless beacon and an RSSI value associated with the received wireless beacon may be determined. In examples, when the RSSI value satisfies a threshold RSSI value, the primary device may establish the non-bonded connection with the secondary device. It should be understood that one, some, or all of the confirmatory processes described herein may be performed. In examples, these processes may increase a confidence level that the primary device and the secondary device should be connected.

At block 710, the process 700 may include sending, in response to determining that the user is present and receiving the second data from the first device indicated to be associated with the electronic device and, a command to the first device, the command configured to cause the first device to establish a secure wireless connection with the electronic device while the electronic device is present in the environment and without pairing the electronic device to the first device. For example, in situations where the primary device is determined to be authorized to establish a non-bonded connection with the secondary device, and where presence of a user is detected, a command generator may be utilized to generate a command for the primary device to establish the non-bonded connection. The command may cause the primary device to utilize the security credentials previously sent to the primary device to establish the non-bonded connection. In some examples, instead of sending a command, the remote system may send an indication that the connection is authorized, and the primary device may utilize that indication to establish the non-bonded connection.

Additionally, or alternatively, the process 700 may include determining that the wireless beacon is received at the first device for at least a threshold amount of time. In these examples, sending the command to the voice interface device may be in response to the wireless beacon being received at the voice interface device for at least the threshold amount of time.

Additionally, or alternatively, the process 700 may include identifying a wireless network access point to be utilized by the first device for communicating with the electronic device. The process 700 may also include causing third data sent from the first device to the electronic device utilizing a network layer of a computer networking model for sending data from the first device to the electronic device to be encrypted. The process 700 may also include determining an application associated with functionality of the electronic device. The process 700 may also include causing fourth data sent from the first device and to the electronic device utilizing an application layer of the computer networking model to be encrypted. The process 700 may also include determining to refrain from sending data from the first device to the electronic device utilizing a link layer of the computer networking model. In other examples, double encryption may be performed at the application layer and at the presentation layer of the computer networking model. In these examples, the application-layer encryption may promote secure communication between applications running on the primary device and the secondary device. The presentation-layer encryption may promote secure communications for data translation for the network.

Additionally, or alternatively, the process 700 may include sending, in response to the first data and to a group of devices including the first device, a second security token configured to permit the connection between the electronic device and the first device. The process 700 may also include determining, in response to receiving the second data, that the first device is approved for connection to the electronic device. In these examples, the command causes the first device and the electronic device to exchange the first security token and the second security token.

FIG. 8 illustrates a flow diagram of another example process 800 for pairing-less device connectivity. The order in which the operations or steps are described is not intended to be construed as a limitation, and any number of the described operations may be combined in any order and/or in parallel to implement process 800.

At block 802, the process 800 may include receiving first data indicating a first device to be associated with a second device. As used with respect to FIG. 8, the first device may be described as a secondary device and the second device may be described as a primary device. A given secondary device may be associated with an application and system for operation of the secondary device. In these examples, the application may be utilized to register the secondary device, including gathering information including the device identifier for the secondary device, the user device where the application is installed and/or accessed, an identifier of an enterprise and/or enterprise system associated with the secondary device, an identifier of a given environment associated with the user, and/or limitations on associations between a user and environments, such as a duration of when the user is associated with an environment. Acquisition of the this association data, and/or the registration of a secondary device as described herein may be performed in multiple ways. For example, a visual device indicator may be provided on the secondary device and the user may provide user input to the application corresponding to the visual device indicator. In other examples, a code of the secondary device may be scannable to acquire the device identifier. In still other examples, near-field communication techniques may be utilized to acquire the device identifier. Additionally, associations between the secondary device and the environments at issue and/or accounts associated with a user may be acquired by user input to the application, by querying a system associated with the environment, and/or by querying systems associated with the secondary device. By way of example, the secondary device may be a wearable device that is acquired in association with a guest checking in at a hotel. The identifier of the secondary device may be associated with the guest, with the room the guest is staying at, with the hotel the guest is staying at, and/or one or more attractions and/or events that the guest has registered for. Data indicating these associations may be received at the remote system, from the system associated with the environment, and/or from one or more other systems associated with the secondary device and/or the environment.

At block 804, the process 800 may include receiving, from the second device, second data indicating an identifier of a wireless component of the first device was received by the second device. For example, a user may transport, such as by wearing and walking, the secondary device from location to location. The secondary device may emit a wireless beacon periodically or otherwise repeatedly. When the secondary device comes into proximity of the primary device such that the primary device receives the wireless beacon, the primary device may initiate establishing the non-bonded connection between the devices.

At block 806, the process 800 may include determining, utilizing third data associated with the second device, that a user associated with the first device is present in an environment associated with the second device. For example, prior to establishing the non-bonded connection, the remote system may perform one or more presence confirmation operations to confirm that a user associated with the secondary device is present in the environment where the primary device is situated. Again utilizing the hotel example, a hotel room may have multiple spaces each having their own primary device, but the user and the secondary device may be located in just one of those spaces. In this example, the primary devices in all of the spaces may detect the wireless beacon, but a connection would be desirable to just the device where the user is present. To perform the presence confirmation operations, sensor data may be received from the environment in question. The sensor data may be received from any sensor associated with the environment, including, for example, a microphone, a camera, a thermometer, etc. The sensor data may also be received from one or more devices associated with the environment, such as a user device associated with the user, door locks, etc.

The sensor data may be analyzed by a presence component to determine whether a user is present in the environment where the primary device at issue is disposed. For example, the presence component may utilize audio data from a microphone of the environment to identify the presence of user speech, footsteps, user movement, and/or user interaction with the environment, which may indicate presence of a user. By way of other examples, image data may be analyzed to detect movement in the environment, and/or device-beaconing data from a user device may indicate that the user device is present in the environment.

In addition to, or instead of, presence confirmation operations as described herein, other confirmatory operations may be performed. For example, the primary device and/or the remote system may determine that the wireless beacon as transmitted from the secondary device is received at the primary device for at least a threshold amount of time. For example, for certain primary devices, if the user moves past the primary device but then continues on to another space, connection to the primary device may not be desirable. As such, connection to the primary device may occur, in these examples, when the wireless beacon is received at the primary device for at least the threshold amount of time, such as, for example, for at least 5 seconds. In still other examples, a RSSI value may be utilized. For example, it may be desirable to connect to a primary device when the secondary device is sufficiently close to the primary device. The primary device may receive the wireless beacon and an RSSI value associated with the received wireless beacon may be determined. In examples, when the RSSI value satisfies a threshold RSSI value, the primary device may establish the non-bonded connection with the secondary device. It should be understood that one, some, or all of the confirmatory processes described herein may be performed. In examples, these processes may increase a confidence level that the primary device and the secondary device should be connected.

At block 808, the process 800 may include sending, based at least in part on the second data and the user being present, a command to the second device, the command causing the second device to establish a wireless non-bonded connection with the first device. For example, in situations where the primary device is determined to be authorized to establish a non-bonded connection with the secondary device, and where presence of a user is detected, a command generator may be utilized to generate a command for the primary device to establish the non-bonded connection. The command may cause the primary device to utilize the security credentials previously sent to the primary device to establish the non-bonded connection. In some examples, instead of sending a command, the remote system may send an indication that the connection is authorized, and the primary device may utilize that indication to establish the non-bonded connection.

Additionally, or alternatively, the process 800 may include determining that the identifier of the wireless component is received at the second device for at least a threshold amount of time. In these examples, sending the command may be based at least in part on the the identifier of the wireless component being received at the second device for at least the threshold amount of time.

Additionally, or alternatively, the process 800 may include causing fourth data sent from the first device to the second device utilizing a network layer of a computer networking model for sending data to be encrypted. The process 800 may also include causing fifth data sent from the first device to the second device utilizing an application layer of the computer networking model to be encrypted. The process 800 may also include determining to refrain from sending data from the first device to the second device utilizing a link layer of the computer networking model. In other examples, double encryption may be performed at the application layer and at the presentation layer of the network. In these examples, the application-layer encryption may promote secure communication between applications running on the primary device and the secondary device. The presentation-layer encryption may promote secure communications for data translation for the network.

Additionally, or alternatively, the process 800 may include sending, based at least in part on the first data and to a group of devices including the second device, first permissions data configured to secure a connection between the second device and the first device, the first device having installed thereon second permissions data configured to secure the connection. The process 800 may also include determining, based at least in part on the second data, that the second device is approved for connection to the first device. In these examples, the command causes the second device to connect to the first device utilizing the first permissions data and the second permissions data.

Additionally, or alternatively, the process 800 may include receiving, from an application associated with the first device, and indication that the first device has been associated with a first identifier of the environment. The process 800 may also include determining that a second identifier of the second device is associated with the first identifier of the environment. The process 800 may also include generating an association between the second identifier of the second device and a third identifier of the first device, the association indicating that the first device is authorized to establish the non-bonded connection to the second device.

Additionally, or alternatively, the process 800 may include causing a first identifier of the first device to be changed periodically, wherein the second data indicates a second identifier of the first device at the time the second data is received at the second device. The process 800 may also include determining that the second identifier as received at the second device corresponds to the first identifier. In these examples, sending the command may be based at least in part on the second identifier corresponding to the first identifier.

Additionally, or alternatively, the process 800 may include receiving an indication that the first device has been associated with an application. The process 800 may also include determining a group of devices associated with the application, the group of devices including the second device. The process 800 may also include generating an association between the first device and the group of devices, the association indicating that the group of devices is authorized to establish the non-bonded connection with the first device.

Additionally, or alternatively, the process 800 may include receiving audio data from the second device and determining that the audio data includes user speech. The process 800 may also include receiving signal strength data from the second device, the signal strength data indicating a signal strength between the first device and the second device. The process 800 may also include generating the third data based at least in part on the audio data including user speech and the signal strength data.

Figure 9:
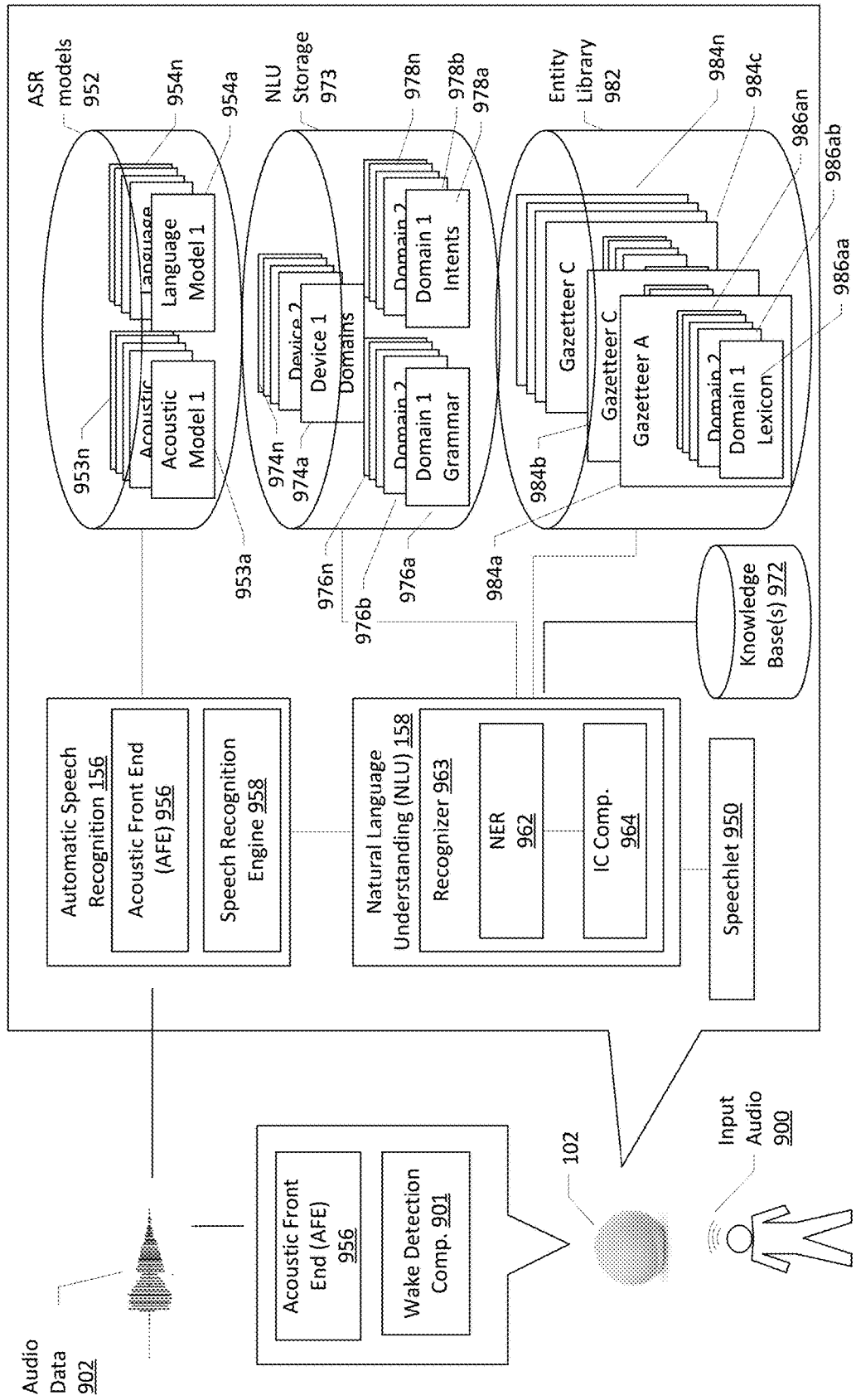
FIG. 9 illustrates a conceptual diagram of components of a speech-processing system for processing audio data provided by one or more devices.

FIG. 9 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 9 may occur directly or across a network 108. An audio capture component, such as a microphone 116 of the device 102, or another device, captures audio 900 corresponding to a spoken utterance. The device 102, using a wake word engine 901, then processes audio data corresponding to the audio 900 to determine if a keyword (such as a wakeword) is detected in the audio data. Following detection of a wakeword, the device 102 processes audio data 902 corresponding to the utterance utilizing an ASR component 156. The audio data 902 may be output from an optional acoustic front end (AFE) 956 located on the device prior to transmission. In other instances, the audio data 902 may be in a different form for processing by a remote AFE 956, such as the AFE 956 located with the ASR component 156.

The wake word engine 901 works in conjunction with other components of the user device, for example a microphone to detect keywords in audio 900. For example, the device may convert audio 900 into audio data, and process the audio data with the wake word engine 901 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input: the energy levels of the audio input in one or more spectral bands: the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 901 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 901 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake." The audio data 902 may include data corresponding to the wakeword. Further, a local device may "wake" upon detection of speech/spoken audio above a threshold, as described herein. An ASR component 156 may convert the audio data 902 into text. The ASR transcribes audio data into text data representing the words of the speech contained in the audio data 902. The text data may then be used by other components for various purposes, such as executing system commands, inputting data, etc. A spoken utterance in the audio data is input to a processor configured to perform ASR which then interprets the utterance based on the similarity between the utterance and pre-established language models 954 stored in an ASR model knowledge base (ASR Models Storage 952). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 953 stored in an ASR Models Storage 952), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 156 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 956 and a speech recognition engine 958. The acoustic front end (AFE) 956 transforms the audio data from the microphone into data for processing by the speech recognition engine 958. The speech recognition engine 958 compares the speech recognition data with acoustic models 953, language models 954, and other data models and information for recognizing the speech conveyed in the audio data. The AFE 956 may reduce noise in the audio data and divide the digitized audio data into frames representing time intervals for which the AFE 956 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the output from the AFE 956 with reference to information stored in speech/model storage (952). Alternatively, post front-end processed data (such as feature vectors) may be received by the device executing ASR processing from another source besides the internal AFE. For example, the user device may process audio data into feature vectors (for example using an on-device AFE 956).

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, change Band A color to red?" The wake detection component may identify the wake word, otherwise described as a trigger expression, "Alexa," in the user utterance and may "wake" based on identifying the wake word. The speech recognition engine 958 may identify, determine, and/or generate text data corresponding to the user utterance, here "change Band A color to red."

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 958 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 158 may include various components, including potentially dedicated processor(s), memory, storage, etc. As shown in FIG. 9, an NLU component 158 may include a recognizer 963 that includes a named entity recognition (NER) component 962 which is used to identify portions of query text that correspond to a named entity that may be recognizable by the system. A downstream process called named entity resolution links a text portion to a specific entity known to the system. To perform named entity resolution, the system may utilize gazetteer information (984a-984n) stored in entity library storage 982. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 156 based on the utterance input audio 900) and attempts to make a semantic interpretation of the text. That is, the NLU process determines the meaning behind the text based on the individual words and then implements that meaning. NLU processing 158 interprets a text string to derive an intent or a desired action from the user as well as the pertinent pieces of information in the text that allow a device (e.g., device 102) to complete that action. For example, if a spoken utterance is processed using ASR 156 and outputs the text "change Band A color to red" the NLU process may determine that the user intended to cause a wearable device near the device 102 to emit red light.

The NLU 158 may process several textual inputs related to the same utterance. For example, if the ASR 156 outputs N text segments (as part of an N-best list), the NLU may process all N outputs to obtain NLU results.

As will be discussed further below, the NLU process may be configured to parse and tag to annotate text as part of NLU processing. For example, for the text "change Band A color to red," "change color" may be tagged as a command (to cause a device to emit a colored light) and "red" may be tagged as the naming identifier of the color.

To correctly perform NLU processing of speech input, an NLU process 158 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 962 receives a query in the form of ASR results and attempts to identify relevant grammars and lexical information that may be used to construe meaning. To do so, the NLU component 158 may begin by identifying potential domains that may relate to the received query. The NLU storage 973 includes a database of devices (974a-974n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 963, language model and/or grammar database (976a-976n), a particular set of intents/actions (978a-978n), and a particular personalized lexicon (986). Each gazetteer (984a-984n) may include domain-indexed lexical information associated with a particular user and/or device. For example, the Gazetteer A (984a) includes domain-index lexical information 986aa to 986an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 964 parses the query to determine an intent or intents for each identified domain, where the intent corresponds to the action to be performed that is responsive to the query. Each domain is associated with a database (978a-978n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 964 identifies potential intents for each identified domain by comparing words in the query to the words and phrases in the intents database 978. In some instances, the determination of an intent by the IC component 964 is performed using a set of rules or templates that are processed against the incoming text to identify a matching intent.

In order to generate a particular interpreted response, the NER 962 applies the grammar models and lexical information associated with the respective domain to actually recognize a mention of one or more entities in the text of the query. In this manner, the NER 962 identifies "slots" or values (i.e., particular words in query text) that may be needed for later command processing. Depending on the complexity of the NER 962, it may also label each slot with a type of varying levels of specificity (such as noun, place, device name, device location, city, artist name, song name, amount of time, timer number, or the like). Each grammar model 976 includes the names of entities (i.e., nouns) commonly found in speech about the particular domain (i.e., generic terms), whereas the lexical information 986 from the gazetteer 984 is personalized to the user(s) and/or the device. For instance, a grammar model associated with the shopping domain may include a database of words commonly used when people discuss shopping.

The intents identified by the IC component 964 are linked to domain-specific grammar frameworks (included in 976) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (976) framework or frameworks may correspond to sentence structures such as "purchase item called 'Item A' from Marketplace A."

For example, the NER component 962 may parse the query to identify words as subject, object, verb, preposition, etc., based on grammar rules and/or models, prior to recognizing named entities. The identified verb may be used by the IC component 964 to identify intent, which is then used by the NER component 962 to identify frameworks. A framework for the intent of "play a song," meanwhile, may specify a list of slots/fields applicable to play the identified "song" and any object modifier (e.g., specifying a music collection from which the song should be accessed) or the like. The NER component 962 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 962 may search the database of generic words associated with the domain (in the knowledge base 972). So, for instance, if the query was "identify this song," after failing to determine which song is currently being output, the NER component 962 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 950. The destination speechlet 950 may be determined based on the NLU output. For example, if the NLU output includes a command to send a message, the destination speechlet 950 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the speechlet 950 may provide some or all of this information to a text-to-speech (TTS) engine. The TTS engine may then generate an actual audio file for outputting the audio data determined by the application (e.g., "okay," or "color changed").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 146 during runtime operations where NLU operations are performed on text (such as text output from an ASR component 156). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 963. Each recognizer may include various NLU components such as an NER component 962, IC component 964 and other components such as an entity resolver, or other components.

For example, a messaging domain recognizer 963-A (Domain A) may have an NER component 962-A that identifies what slots (i.e., portions of input text) may correspond to particular words relevant to that domain. The words may correspond to entities such as (for the messaging domain) a recipient. An NER component 962 may use a machine learning model, such as a domain specific conditional random field (CRF) to both identify the portions corresponding to an entity as well as identify what type of entity corresponds to the text portion. The messaging domain recognizer 963-A may also have its own intent classification (IC) component 964-A that determines the intent of the text assuming that the text is within the proscribed domain. An IC component may use a model, such as a domain specific maximum entropy classifier to identify the intent of the text, where the intent is the action the user desires the system to perform. For this purpose, device 102 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 106, as illustrated herein are exemplary, and may be located in a stand-alone device or may be included, in whole or in part, as a component of a larger device or system, may be distributed across a network or multiple devices connected by a network, etc.

Figure 10:
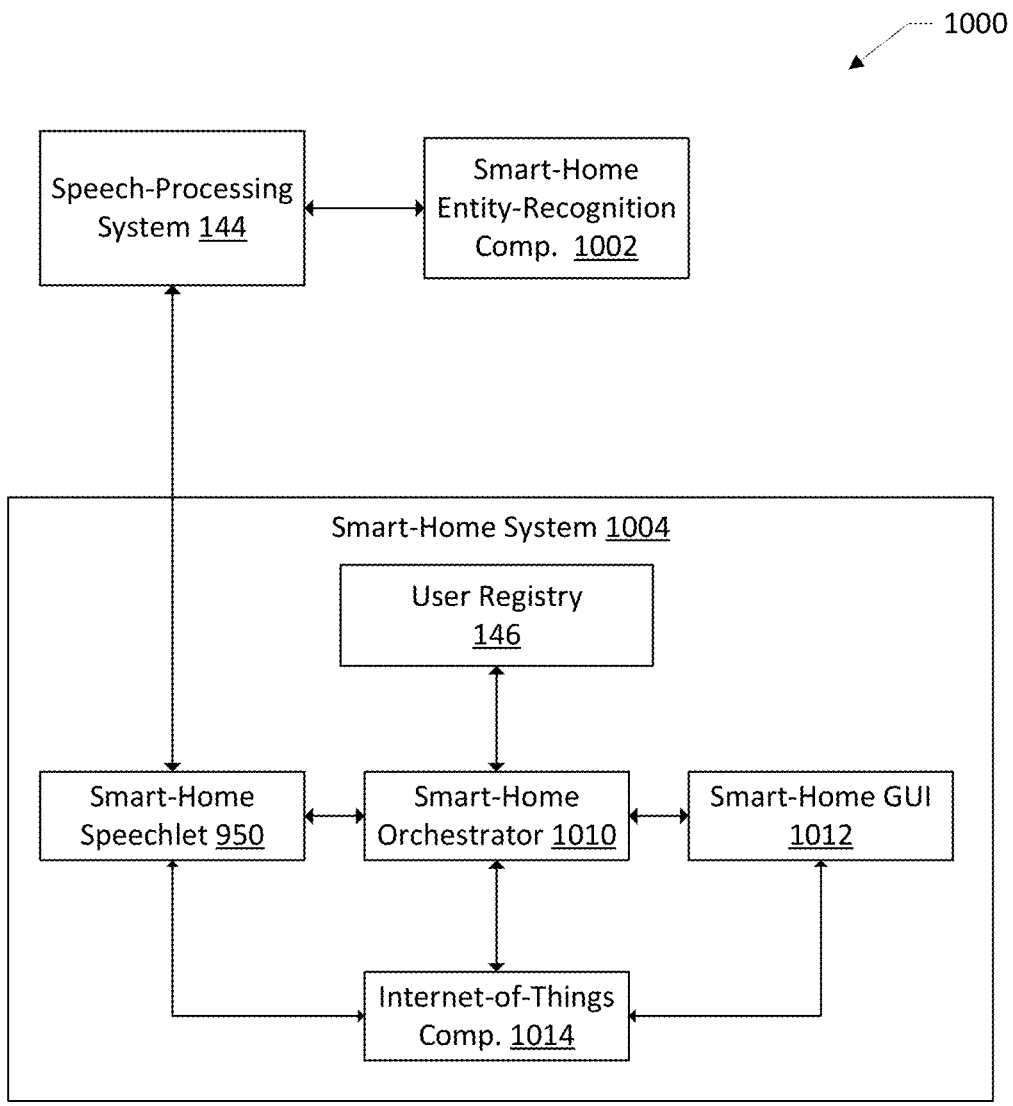
FIG. 10 illustrates a conceptual diagram of example components of a smart-home system that may be utilized for pairing-less device connectivity.

FIG. 10 illustrates a conceptual diagram of example components of a smart-home system that may be utilized for pairing-less device connectivity. The smart-home system 1004 may include components such as a smart-home speechlet 950, for example. The smart-home system 1004 may also be configured to send data to and receive data from other components of a system and/or one or more other systems. For example, the other components may include a speech-processing system 144. The smart-home system 1004 may also include components such as a smart-home orchestrator 1010, a smart-home graphical user interface (GUI) 1012, and/or an internet-of-things component 1014. Each of these components will be described in detail below.

As described herein, a user may interact with a smart device using tactile input to the smart device, voice input to a voice-controlled device, and/or input to an application residing on and/or accessible to a personal device. When a user interacts with a smart device using voice input to a voice-controlled device, audio data representing user utterances may be received at the speech-processing system 144. The speech-processing system 144 may analyze the audio data and/or corresponding text data generated, by way of example, using an ASR component, to determine that the user utterance represents an intent to control a smart device. To determine the intent associated with the user utterance, the speech-processing system 144 may utilize a smart-home entity-recognition component 1002, which may be utilized to inform one or more intents available to the speech-processing system 144 and/or to inform one or more values associated with the intents. For example, the user utterance of "turn off bedroom lights" may be analyzed by the speech-processing system 144. The smart-home entity-recognition component 1002 may train or otherwise provide data to the speech-processing system 144 indicating intents associated with operation of smart devices, such as "turn on," "turn off," "activate," "deactivate," "dim," "brighten," "lock," "unlock," etc. The smart-home entity-recognition component 1002 may additionally, or alternatively, provide data indicating identifiers and/or payloads associated with such intents, such as "light," "lights," "lock," "outlet," "switch," etc. It should be understood that while the smart-home entity-recognition component 1002 is depicted in FIG. 10 as being a component separate from the smart-home system 1004, the smart-home entity-recognition component 1002 may be a component of the smart-home system 1004.

The speech-processing system 144 may be configured to determine that the intent corresponds to an operation configured to be performed by the smart-home system 1004, and based at least in part on such a determination, the speech-processing system 1004 may provide the intent data and/or other data associated with the request to the smart-home speechlet 950 of the smart-home system 1004. The smart-home orchestrator 1010 may be configured to receive data indicating that the smart-home speechlet 950 has been invoked to determine a directive to be performed with respect to a smart device and may query one or more other components of the smart-home system 1004 to effectuate the request. For example, the smart-home orchestrator 1010 may query the internet-of-things component 1014 to identify naming indicators associated with smart devices for a particular user account. The internet-of-things component 1014 may query data store(s) and/or the user registry 146 and/or the user account for such naming indicators.

In other examples, such as when the smart-home speechlet 950 receives a request to discover a smart device, such as from a smart-device system, the smart-home orchestrator 1010 may query one or more components of the smart-home system 1004 to determine associations between smart device identifiers and user account identifiers as described herein. Additionally, or alternatively, as mentioned above, the smart devices may be operated based at least in part on input data received from an application residing on and/or accessible to a personal device, such as a mobile phone and/or computer. The smart-home GUI 1012 may be utilized to receive the input data and/or to display recommendations and/or requests to a user. For example, the smart-home GUI 1012 may be utilized to display a request to confirm that a selected smart device is the desired device to be acted upon.

Figure 11:
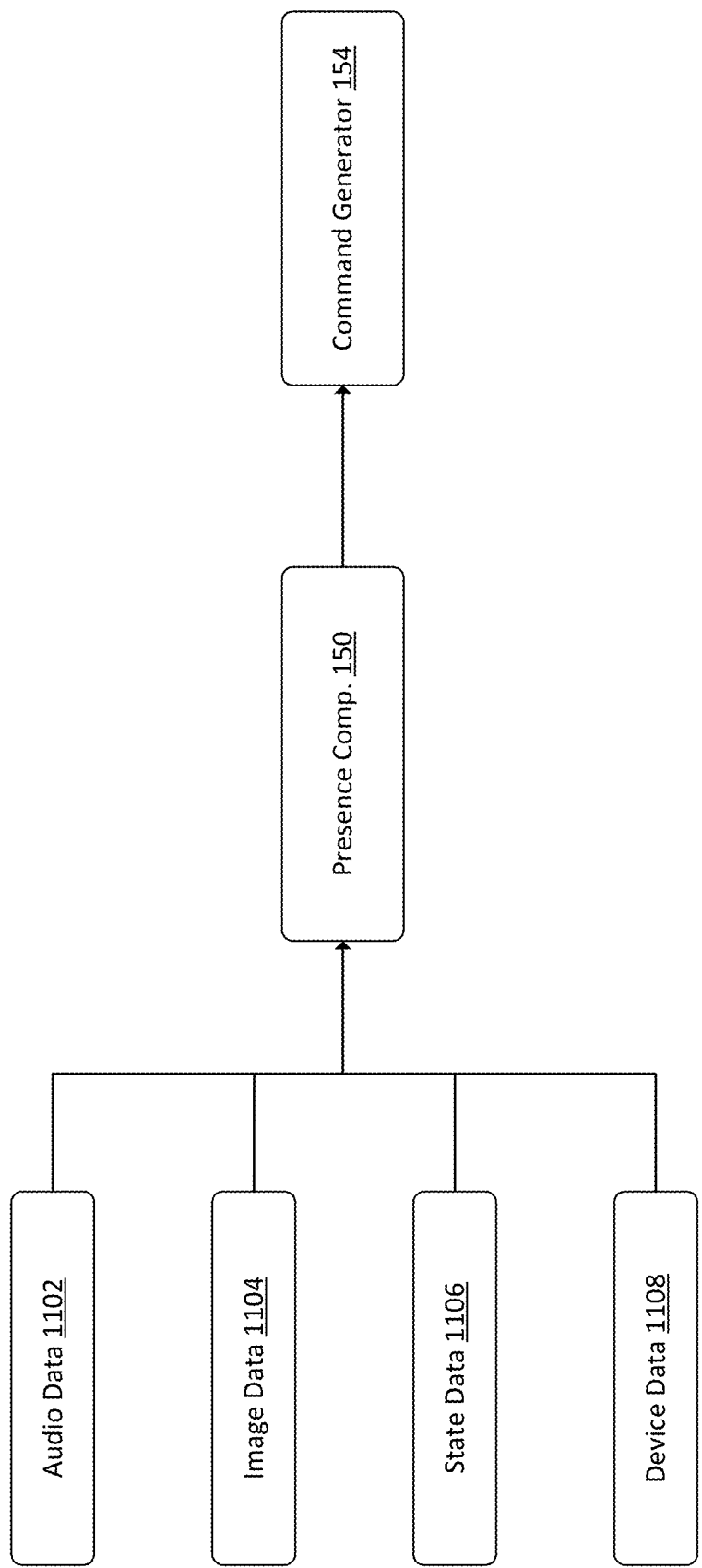
FIG. 11 illustrates a conceptual diagram of example presence detection utilized for pairing-less device connectivity.

FIG. 11 illustrates a conceptual diagram of example presence detection utilized for pairing-less device connectivity. FIG. 11 depicts example data types that may be utilized by a presence component 150 to detect the presence of a user in an environment.

Example data types for detecting presence may include audio data 1102, image data 1104, state data 1106, and/or device data 1108. The audio data 1102 may be received from a microphone associated with an environment where a given device is situated. The audio data 1102 may be analyzed by the presence component 150 to determine whether the audio data 1102 indicates the presence of user speech, footsteps, use of devices in the environment, and/or the presence of other noises that are indicative of a user being present. To do so, the presence component 150 may compare the audio data 1102 to reference audio data to detect the presence of such noises. In examples where user speech is to be detected, ASR data may be utilized and/or detection of a wake word may be utilized.

When image data 1104 is described herein as being analyzed, that analysis may include the use of computer vision to identify objects depicted in the image data 1104. For example, with respect to computer vision techniques, computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading-Reading of 2D codes such as data matrix and QR codes. Facial Recognition. Shape Recognition Technology (SRT)—Differentiating human beings (e.g., head and shoulder patterns) from objects.

Some functions and components (e.g., hardware) found in many computer vision systems are described here. For example, a digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance. Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales. Image features at various levels of complexity are extracted from the image data. Typical examples of such features are: Lines, edges, and ridges; Localized interest points such as corners, blobs, or points: More complex features may be related to texture, shape, or motion. At some point in the processing a decision may be made about which image points or regions of the image are relevant for further processing. Examples are: Selection of a specific set of interest points: Segmentation of one or multiple image regions that contain a specific object of interest: Segmentation of the image into nested scene architecture comprising foreground, object groups, single objects, or salient object parts (also referred to as spatial-taxon scene hierarchy). At this point, the input may be a small set of data, for example a set of points or an image region that is assumed to contain a specific object. The remaining processing may comprise, for example: verification that the data satisfy model-based and application-specific assumptions: estimation of application-specific parameters, such as object pose or object size: classifying a detected object into different categories; and comparing and combining two different views of the same object. Making the final decision required for the application, for example match/no-match in recognition applications, may then be performed.

When state data 1106 is utilized, the state data 1106 may indicate when and how device states have changed for devices in the environment. For example, when a smart light is turned on, an indication of the change of state from off to on may be stored. The state itself, or the timing of the state change may indicate that a user is present in the environment and/or that the user is likely present.

When device data 1108 is utilized, the device data 1108 may indicate the presence of a personal device associated with a user, such as a mobile phone and/or a wearable device. These devices may send out beacons that are received at a given primary device, indicating that the devices are proximate to the primary device and also indicating that the user associated with such devices are present.

When presence is detected, a command generator 154 may be utilized to generate a command for the primary device to establish the non-bonded connection. The command may cause the primary device to utilize the security credentials previously sent to the primary device to establish the non-bonded connection. In some examples, instead of sending a command, the remote system may send an indication that the connection is authorized, and the primary device may utilize that indication to establish the non-bonded connection. To establish the non-bonded connection, a connection component of the primary device and the secondary device may utilize a short-range network and protocols associated with that network, such as Bluetooth Low Energy, to send and receive data, but without the requirement of pairing and without transmitting data via a link layer of the network.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
   one or more processors; and
   non-transitory computer-readable media storing computer-executable instructions that, when executed by the one or more processors, cause the one or more processors to perform operations comprising:
      receiving a device identifier associated with an electronic device, the electronic device having a first security token for securing a connection between the electronic device and one or more devices;
      receiving first data indicating a first device to be associated with the electronic device;
      receiving, from the first device, second data indicating that a wireless beacon has been received from the electronic device at the first device;
      detecting, utilizing audio data associated with the electronic device, that the audio data includes a user-made non-speech acoustic event predefined to be associated with user presence in an environment in which the first device resides;
      determining that a device state change has occurred with respect to the electronic device within a period of time from when the wireless beacon has been received;
      determining, based at least in part on detecting the user-made non-speech acoustic event and the device state change occurring, that a human user is physically present in the environment; and
      sending, in response to determining that the human user is present and receiving the second data from the first device, a command to the first device, the command configured to cause the first device to establish a secure wireless connection with the electronic device while the electronic device is present in the environment.

2. The system of claim 1, the operations further comprising:
   determining that the wireless beacon is received at the first device for at least a threshold amount of time; and
   wherein sending the command to the first device is in response to the wireless beacon being received at the first device for at least the threshold amount of time.

3. The system of claim 1, the operations further comprising:
   identifying a wireless network access point to be utilized by the first device for communicating with the electronic device;
   causing third data sent from the first device to the electronic device utilizing a network layer of a computer networking model for sending data from the first device to the electronic device to be encrypted;
   determining an application associated with functionality of the electronic device;
   causing fourth data sent from the first device and to the electronic device utilizing an application layer of the computer networking model to be encrypted; and determining to refrain from sending data from the first device to the electronic device utilizing a link layer of the computer networking model.

4. The system of claim 1, the operations further comprising:
sending, in response to the first data and to a group of devices including the first device, a second security token configured to permit the connection between the electronic device and the first device;
determining, in response to receiving the second data, that the first device is approved for connection to the electronic device; and
wherein the command causes the first device and the electronic device to exchange the first security token and the second security token.

5. A method, comprising:
receiving first data indicating a first device to be wirelessly connected to a second device;
receiving, wirelessly from the second device, second data indicating an identifier of a wireless component of the first device was received by the second device;
detecting, utilizing audio data associated with the second device, that the audio data includes a user-made non-speech acoustic event predefined to be associated with user presence in an environment in which the second device resides;
determining that a device state change has occurred with respect to the second device within a period of time from when the second data has been received;
determining, based at least in part on detecting the user-made non-speech acoustic event and the device state change, that a human user is present in the environment; and
sending, based at least in part on the second data and the human user being present, a command to the second device, the command causing the second device to establish a wireless connection with the first device.

6. The method of claim 5, wherein the user-made non-speech acoustic event includes characteristics of the audio data that correspond to reference characteristics of reference audio data indicating noises made by users other than speech.

7. The method of claim 5, wherein the device state change is predefined, prior to receiving the audio data, to be associated with user presence.

8. The method of claim 5, further comprising:
determining that the identifier of the wireless component is received at the second device for at least a threshold amount of time; and
wherein sending the command comprises sending the command based at least in part on the identifier of the wireless component being received at the second device for at least the threshold amount of time.

9. The method of claim 5, further comprising:
causing third data sent from the first device to the second device utilizing a network layer of a computer networking model for sending data to be encrypted;
causing fourth data sent from the first device to the second device utilizing an application layer of the computer networking model to be encrypted; and
determining to refrain from sending data from the first device to the second device utilizing a link layer of the computer networking model.

10. The method of claim 5, further comprising:
sending, based at least in part on the first data and to a group of devices including the second device, first permissions data configured to secure a connection between the second device and the first device, the first device having installed thereon second permissions data configured to secure the connection;
determining, based at least in part on the second data, that the second device is approved for connection to the first device; and
wherein the command causes the second device to connect to the first device utilizing the first permissions data and the second permissions data.

11. The method of claim 5, further comprising:
receiving, from an application associated with the first device, an indication that the first device has been associated with a first identifier of the environment;
determining that a second identifier of the second device is associated with the first identifier of the environment; and
generating an association between the second identifier of the second device and a third identifier of the first device, the association indicating that the first device is authorized to establish the wireless connection to the second device.

12. The method of claim 5, further comprising:
causing a first identifier of the first device to be changed periodically, wherein the second data indicates a second identifier of the first device at a time the second data is received at the second device;
determining that the second identifier as received at the second device corresponds to the first identifier; and
wherein sending the command comprises sending the command based at least in part on the second identifier corresponding to the first identifier.

13. The method of claim 5, further comprising:
receiving an indication that the first device has been associated with an application;
determining a group of devices associated with the application, the group of devices including the second device; and
generating an association between the first device and the group of devices, the association indicating that the group of devices is authorized to establish the wireless connection with the first device.

14. The method of claim 5, further comprising:
receiving signal strength data from the second device, the signal strength data indicating a signal strength between the first device and the second device; and
generating the second data based at least in part on the signal strength data.

15. A system, comprising:
one or more processors; and
non-transitory computer-readable media storing computer-executable instructions that, when executed by the one or more processors, cause the one or more processors to perform operations comprising:
receiving a device identifier associated with a first device;
receiving first data indicating a second device to be wirelessly connected to the first device;
receiving, wirelessly from the second device, second data indicating that an identifier of the first device has been received from the first device at the second device;
detecting, utilizing audio data associated with the second device, that the audio data includes a user-made non-speech acoustic event predefined to be associated with user presence in an environment in which the second device resides;

determining that a device state change has occurred with respect to the second device within a period of time from when the second data has been received;

determining, based at least in part on detecting the user-made non-speech acoustic event and the device state change, that a human user is present in environment associated with the second device; and sending, based at least in part on the second data and the human user being present, a command to the second device, the command causing the second device to establish a connection with the first device.

16. The system of claim 15, the operations further comprising:

determining that the second data is received at the second device for at least a threshold amount of time; and wherein sending the command comprises sending the command based at least in part on the second data being received at the second device for at least the threshold amount of time.

17. The system of claim 15, the operations further comprising:

causing third data sent from the first device to the second device utilizing a network layer of a computer networking model for sending data to be encrypted;

causing fourth data sent from the first device to the second device utilizing an application layer of the computer networking model to be encrypted; and determining to refrain from sending data from the first device to the second device utilizing a link layer of the computer networking model.

18. The system of claim 15, the operations further comprising:

sending, based at least in part on the first data and to a group of devices including the second device, first permissions data configured to secure a connection between the second device and the first device, the first device having installed thereon second permissions data configured to secure the connection;

determining, based at least in part on the second data, that the second device is approved for connection to the first device; and wherein the command causes the second device to connect to the first device utilizing the first permissions data and the second permissions data.

19. The system of claim 15, the operations further comprising:

receiving, from an application associated with the first device, an indication that the first device has been associated with a first identifier of the environment;

determining that a second identifier of the second device is associated with the first identifier of the environment; and generating an association between the second identifier of the second device and a third identifier of the first device, the association indicating that the first device is authorized to establish the connection to the second device.

20. The system of claim 15, the operations further comprising:

causing a first identifier of the first device to be changed periodically, wherein the second data indicates a second identifier of the first device at a time the second data is received at the second device;

determining that the second identifier as received at the second device corresponds to the first identifier; and wherein sending the command comprises sending the command based at least in part on the second identifier corresponding to the first identifier.

* * * * *